United States Patent
Ozaki et al.

(10) Patent No.: US 6,813,301 B2
(45) Date of Patent: Nov. 2, 2004

(54) STRUCTURE OF REFLUX FAN FOR EXCIMER LASER APPARATUS

(75) Inventors: Takayoshi Ozaki, Iwata (JP); Yuuji Yada, Iwata (JP); Hironori Tokunaga, Iwata (JP); Koji Yamada, Iwata (JP)

(73) Assignee: NTN Corporation, Osaka (JP)

( * ) Notice: Subject to any disclaimer, the term of this patent is extended or adjusted under 35 U.S.C. 154(b) by 219 days.

(21) Appl. No.: 09/955,309

(22) Filed: Sep. 19, 2001

(65) Prior Publication Data

US 2002/0044588 A1 Apr. 18, 2002

(30) Foreign Application Priority Data

| Sep. 19, 2000 | (JP) | 2000-283486 |
| Sep. 19, 2000 | (JP) | 2000-283487 |
| Sep. 19, 2000 | (JP) | 2000-283488 |
| Oct. 19, 2000 | (JP) | 2000-318819 |

(51) Int. Cl.[7] ............... H01S 3/22; H01S 3/223
(52) U.S. Cl. ............... 372/58; 372/57; 372/37
(58) Field of Search .................. 372/37, 57, 58

(56) References Cited

U.S. PATENT DOCUMENTS

| 5,848,089 A | | 12/1998 | Sarkar et al. | |
| 6,018,537 A | | 1/2000 | Hofmann et al. | |
| 6,026,103 A | * | 2/2000 | Oliver et al. | 372/37 |
| 6,104,735 A | * | 8/2000 | Webb | 372/37 |
| 6,208,675 B1 | * | 3/2001 | Webb | 372/58 |
| 6,337,872 B1 | * | 1/2002 | Nara et al. | 372/58 |
| 6,366,039 B1 | * | 4/2002 | Sekiguchi et al. | 318/268 |
| 6,404,794 B1 | * | 6/2002 | Sekiguchi et al. | 372/57 |
| 6,464,472 B1 | * | 10/2002 | Sekiguchi et al. | 417/351 |
| 6,519,273 B2 | * | 2/2003 | Sekiguchi et al. | 372/58 |
| 6,532,246 B1 | * | 3/2003 | Fukuyama et al. | 372/57 |
| 6,535,539 B1 | * | 3/2003 | Nakao et al. | 372/69 |
| 6,539,043 B1 | * | 3/2003 | Shinozaki et al. | 372/59 |
| 6,577,664 B1 | * | 6/2003 | Nara et al. | 372/58 |
| 6,603,787 B1 | * | 8/2003 | Sekiguchi et al. | 372/57 |

FOREIGN PATENT DOCUMENTS

| EP | 0 875 685 A2 | 11/1998 |
| EP | 1 137 126 A1 | 9/2001 |
| JP | 11-303793 | 11/1999 |
| WO | WO 99/42731 | 8/1999 |
| WO | WO 00/33431 | 6/2000 |

\* cited by examiner

Primary Examiner—Albert J. Gagliardi
Assistant Examiner—Davienne Monbleau
(74) Attorney, Agent, or Firm—McDermott Will & Emery LLP

(57) ABSTRACT

First and second radial magnetic bearings are provided at opposing ends of a rotary shaft, first and second protective bearings are arranged in the vicinity thereof, a third radial magnetic bearing is arranged on a side of a fan near a motor, and by the third radial magnetic bearing, negative spring element of the motor is corrected.

23 Claims, 36 Drawing Sheets

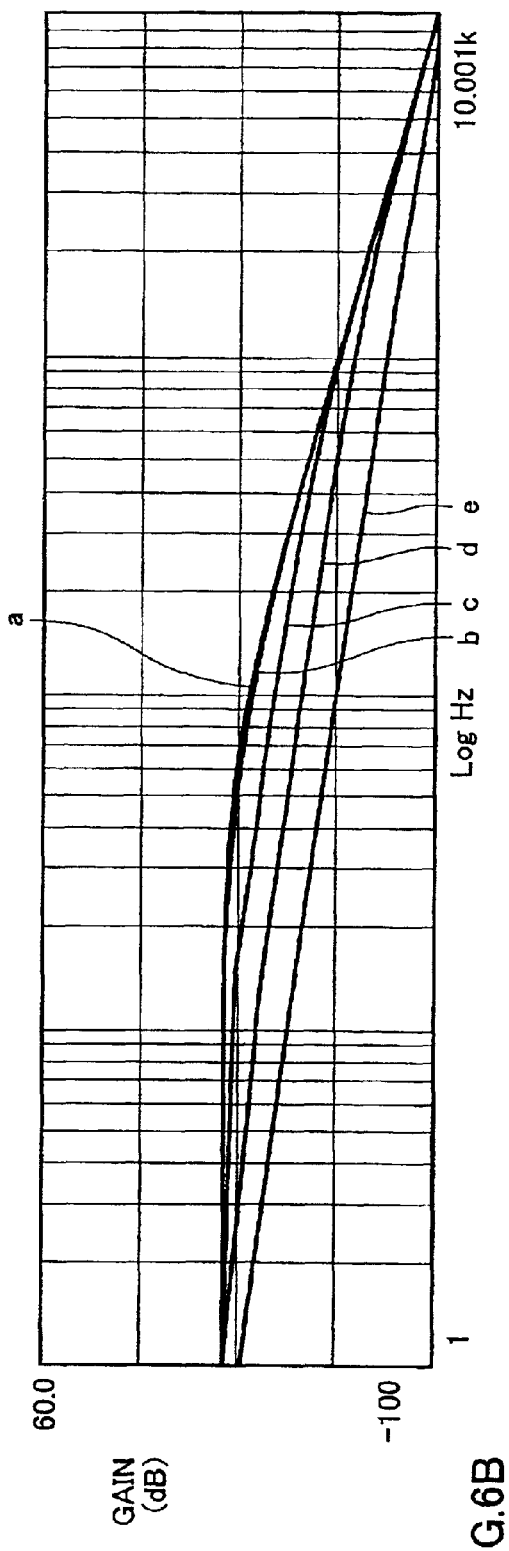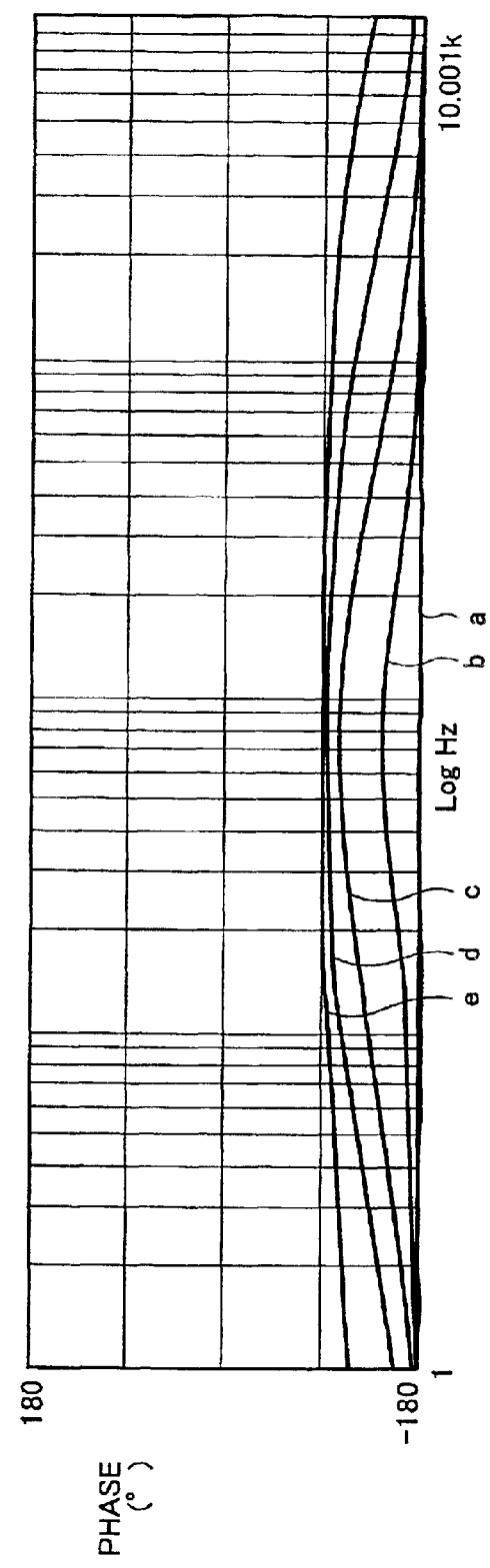

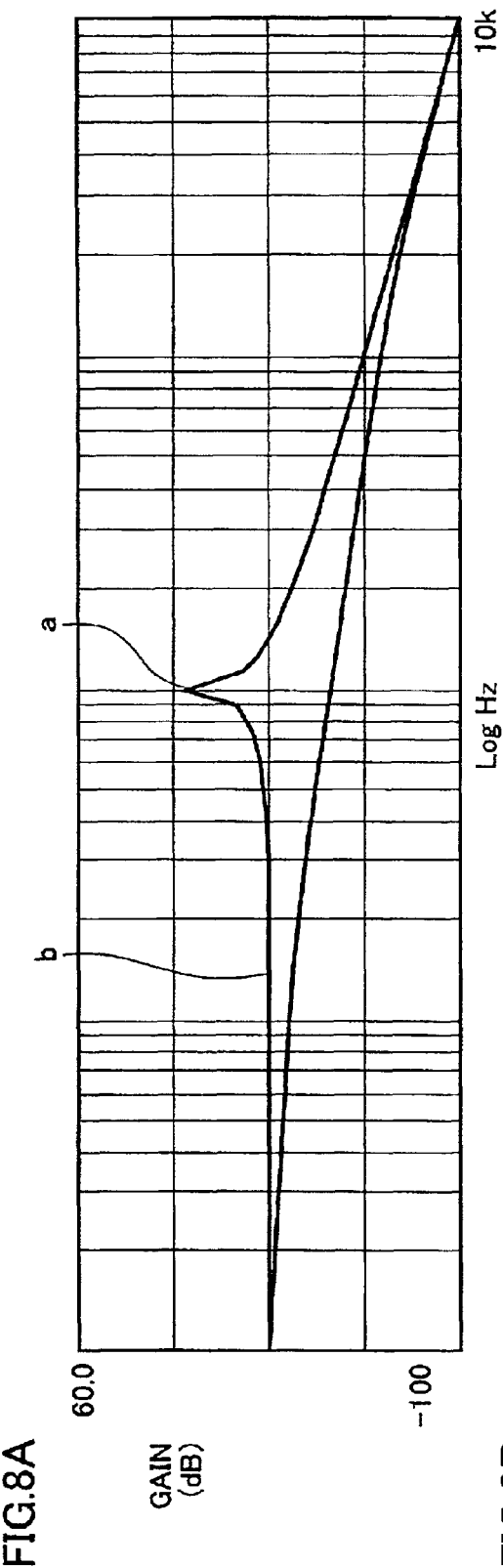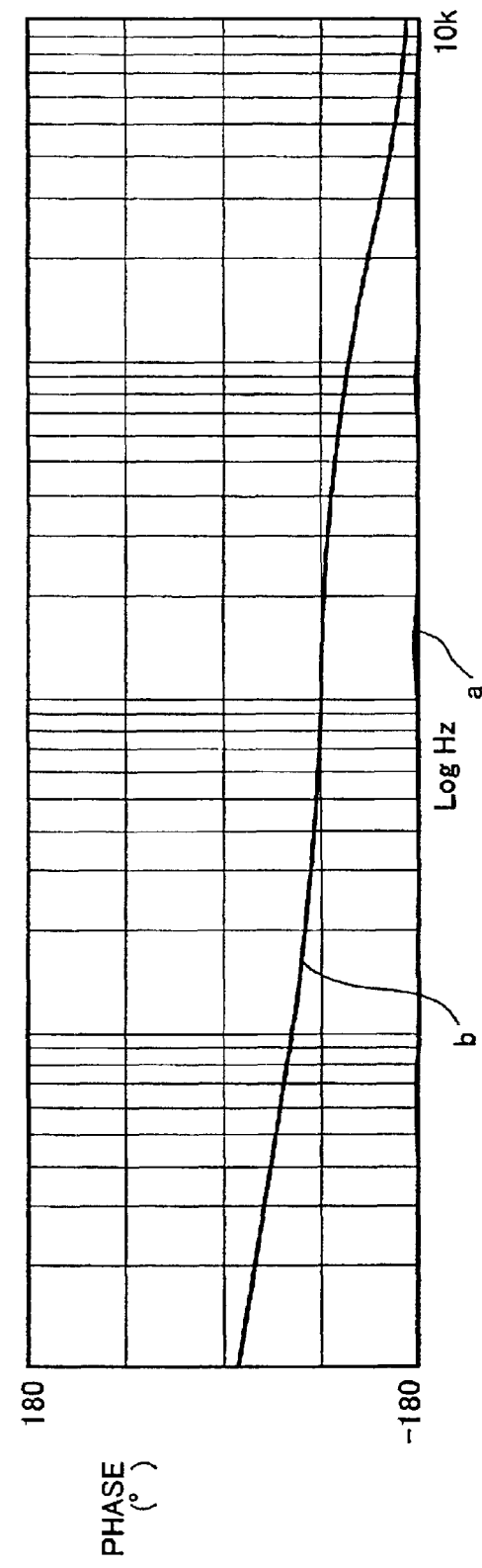
FIG.8A
FIG.8B

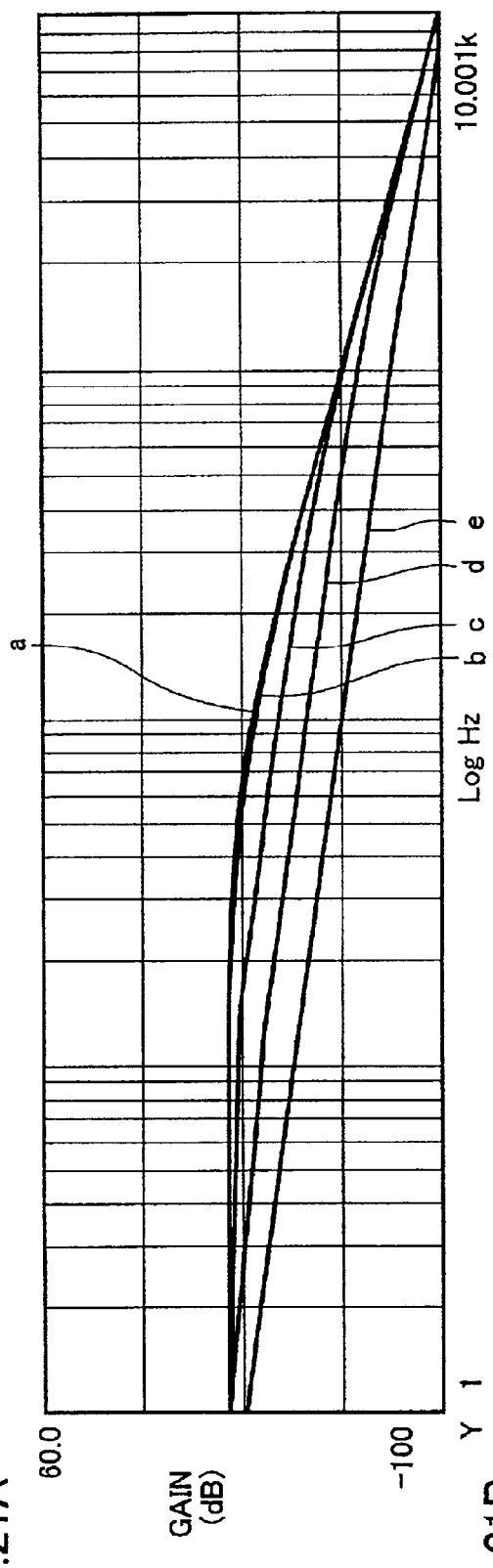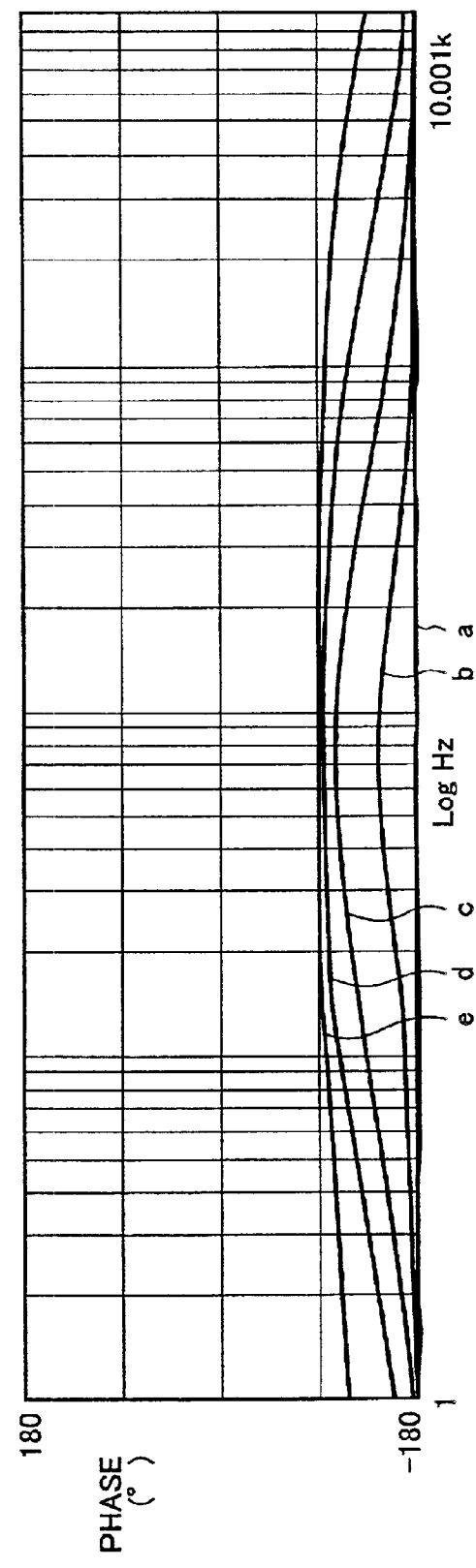
FIG.21A
FIG.21B

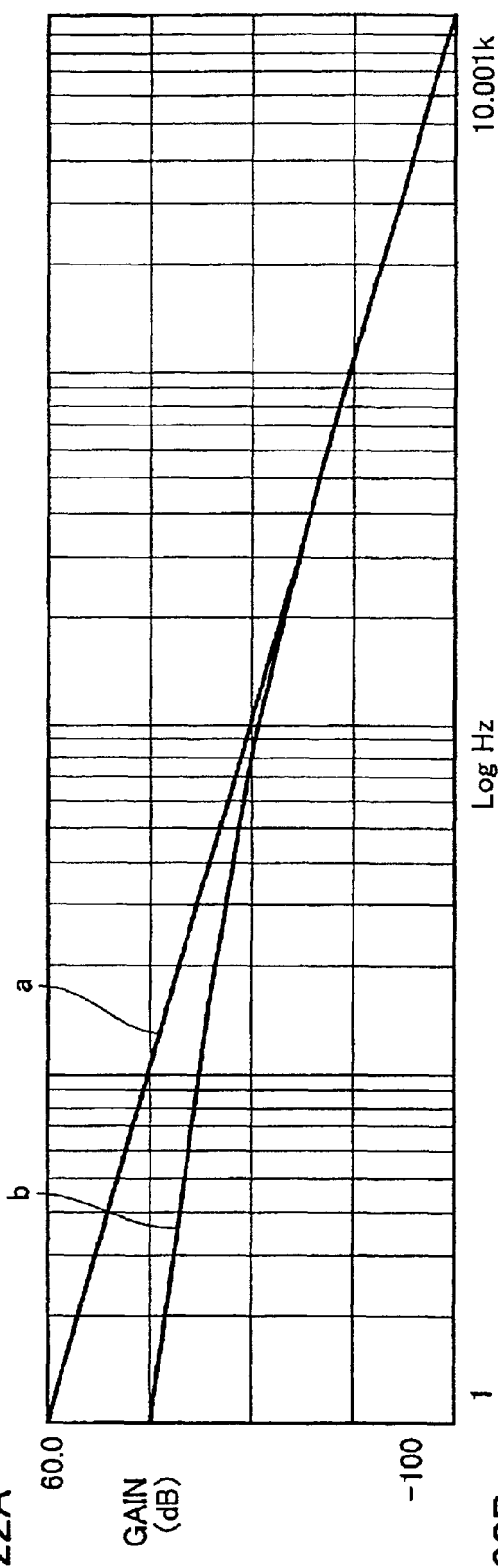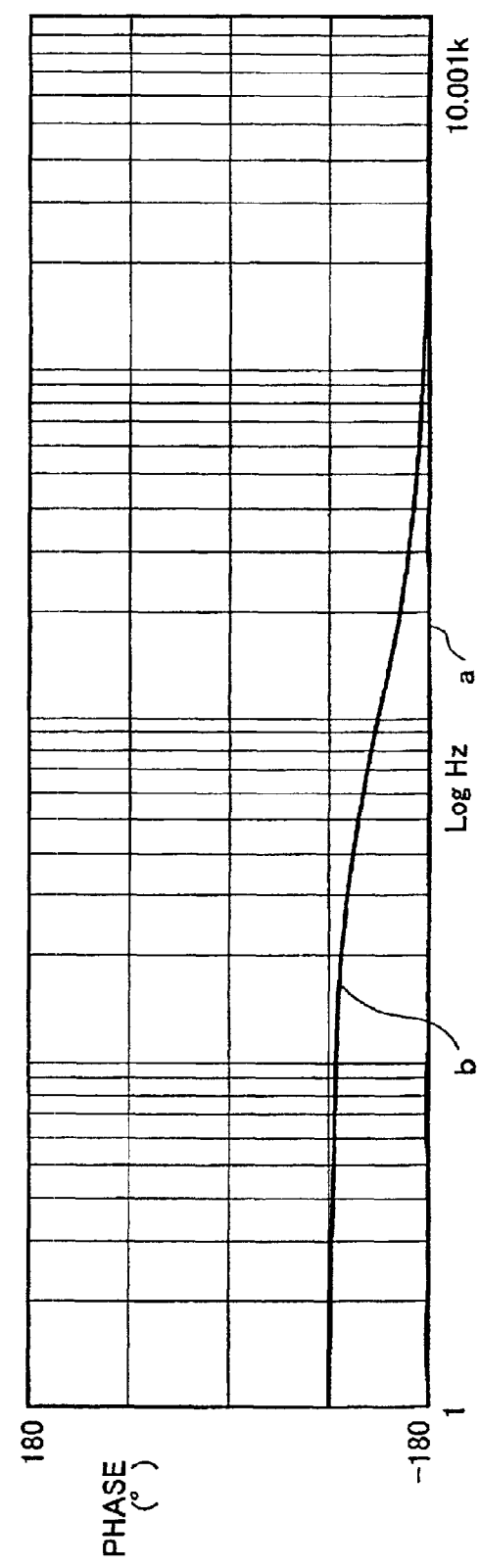

A: MAGNETIC BODY IS FIXED BY PRESS FIT
B: PART OF MAGNETIC BODY IS FIXED BY WELDING
C: MAGNETIC BODY IS FULLY FIXED BY WELDING

GAIN

−180°
PHASE

FREQUENCY

STRUCTURE OF REFLUX FAN FOR EXCIMER LASER APPARATUS

BACKGROUND OF THE INVENTION

1. Field of the Invention

The present invention relates to a structure of a reflux fan for an excimer laser apparatus. More specifically, the present invention relates to a structure that supports and rotates a rotary shaft of a reflux fan for an excimer laser apparatus.

2. Description of the Background Art

A reflux fan for laser gas circulation in an excimer laser apparatus must have low vibration characteristic and durability. To meet such a demand, a magnetic bearing that realizes maintenance-free, non-contact support has been proposed for a bearing to be used in the reflux fan.

For example, U.S. Pat. No. 5,848,089 and Japanese Patent Laying-Open No. 11-303793 disclose examples of use of the magnetic bearing. In these references, a structure is disclosed in which a rotary shaft is supported in a non-contact manner by two radial magnetic bearings and an axial magnetic bearing consisting of an axial electromagnet, and a motor rotor fixed on the rotary shaft is driven to rotate by a motor stator on a stator side.

FIG. 41 is a cross sectional view showing a basic structure of a fan circulating excimer gas and peripheral portion thereof. In FIG. 41, a fan 203 is arranged in a chamber 201, and a laser gas is sealed inside the chamber 201. Fan 203 fixed on a rotary shaft 202 rotates in chamber 201. Magnetic bearings supporting rotary shaft 202 are arranged on opposite sides of chamber 201. On the left side, arranged are: a radial magnetic bearing 206 including a radial electromagnet 204 and a position sensor 205; an axial magnetic bearing 210 including axial electromagnets 207 and 208 and a position sensor 209; a motor 211 including a motor rotor 218 and a motor stator 217; and a protective bearing 212 as a touch down bearing that can support both the radial and axial directions to protect rotary shaft 202.

On the right side of FIG. 41, provided are: a radial magnetic bearing 215 including a radial electromagnet 213 and a position sensor 214; and a protective bearing 216 that can support only the radial direction.

Here, inner diameters of protective bearing 212, motor stator 217 and radial electromagnet 204 are adjusted to be approximately co-axial. A gap between the inner diameter of protective bearing 212 and rotary shaft 202 opposing thereto is set slightly smaller than a minimum dimension of the gap between the inner diameters of motor stator 217 and radial electromagnet 204 and the rotary shaft 202 opposing thereto, so as to prevent contact between rotary shaft 202 and radial electromagnet 204 or motor stator 214.

Axial magnetic bearing 210 and radial magnetic bearings 206 and 215 detect the position of rotary shaft 202 by means of position sensors 209, 205 and 214, respectively, provides signals by comparing operation between respective position sensor outputs and an instruction value, which signals are phase-compensated by a control circuit, not shown, and current-amplified by a power amplifier, so that a current is caused to flow in a coil of a corresponding electromagnet.

In the reflux fan for circulating laser gas in the excimer laser apparatus shown in FIG. 41, the pressure of reflux gas is as high as up to 5000 hPa. In order to rotate fan 202 under such a high output, it is necessary to increase output of motor 211 driving the rotary shaft 202. Because of high motor output, however, attraction between motor rotor 218 and motor stator 217 constituting motor 211 becomes undesirably strong. This not only increases disturbance on rotary shaft 202 containing motor rotor 218, but also affects control stability of radial magnetic bearing 206 supporting rotary shaft 202.

Support by the radial magnetic bearing must be controlled stably both in a state of non-rotation in which motor 211 does not have any influence and in a state of maximum rotation in which motor has significant influence. Further, rotation in every pressure range lower than the maximum value of 5000 hPa of the reflux gas pressure is necessary. Therefore, it has been difficult to ensure stability of control of the magnetic bearing.

FIG. 42 shows a structure near the radial magnetic bearing portion, and FIG. 43 is a block diagram of the magnetic bearing control system illustrating an influence of the motor on the radial magnetic bearing of FIG. 41.

Referring to FIG. 42, a desired distance between electromagnet 204 of the radial magnetic bearing and rotary shaft 202 is represented by $X_0$, and displacement x from the distance $X_0$ is measured. Based on the measurement, attraction force of electromagnet 204 of the radial magnetic bearing is adjusted, so as to control floating position of rotary shaft 202. Here, motor 211 is positioned close to radial magnetic bearing 206, and control of radial magnetic bearing 206 is influenced by motor 211.

Referring to FIG. 43, P(s) represents an object of control of magnetic bearing itself not considering motor 211, G(s) represents transfer function of magnetic bearing control circuit, and x represents displacement from the position of prescribed floating distance $X_0$ of the rotary shaft. After comparing operation between an output x' of the position sensor detecting the displacement x of the rotary shaft with an instruction value r, an electromagnetic force Fa calculated by magnetic bearing control circuit G(s) consisting of a control circuit including proportional, integral and differential elements acts on rotary shaft 202, so that rotary shaft 202 is supported at a prescribed position. Here, Km represents a negative spring constant of motor 211.

Referring to FIG. 42, when rotary shaft 202 moves downward, attraction force Fm from motor stator 217 below increases, and spring constant attains seemingly negative. The value Km increases as the output of motor 211 increases, that is, as the attraction force between motor rotor 218 and motor stator 217 increases. In other words, control of the magnetic bearing must be designed in consideration of the value Km, while the value Km varies widely (when rotary drive is stopped, Km attains 0). Therefore, it is difficult to ensure stability of supporting the magnetic bearing in every state.

FIG. 44 represents a gain curve of Bode diagram of the object of control (in FIG. 43, transfer function from Fa to x), of the magnetic bearing when the motor is driven and not driven. In FIG. 44, solid line a represents gain curve when the motor is not rotating, while solid line b represents gain curve when the motor is being driven. It is understood that the gain curve lowers in a low frequency range, when the motor is driven. Because of this decrease in gain in the low frequency range and because of the characteristic that the gain curve is flat (gain frequency gradient is approximately 0) over a wide range in the low frequency range, controllability of the magnetic bearing degrades.

FIGS. 45A and 45B represent open loop transfer function when a magnetic bearing control circuit ensuring stability in both states (when motor is driven and not driven) is designed, based on the object of control of the magnetic bearing, in which FIG. 45A represents gain characteristic, and FIG. 45B represents phase characteristic.

Referring to FIG. 45A, solid line c represents the open loop transfer function when motor is not driven, while solid line d is when the motor is driven. When motor 211 is driven, gain margin shown in FIG. 45A decreases from A to A', and it is understood that the margin in stability of control decreases significantly. As a countermeasure, it may be possible to set a cross over frequency to higher frequency side to suppress the influence of motor. In the excimer laser apparatus, however, discharge at a high voltage is utilized for laser oscillation, to excite laser gas. Therefore, in order to prevent influence of high frequency noise, in the magnetic bearing used for the excimer laser apparatus, it is necessary to lower as much as possible the control gain of the magnetic bearing.

Further, fan 203 used is long along the axial direction and as a result, rotation shaft 202 itself becomes longer, so that bending mode natural frequency of rotary shaft 202 lowers. In order to realize stable control thereof, it is also necessary to decrease the gain of the magnetic bearing control system. From these reasons, the method of setting the cross over frequency to a higher frequency side, which leads to increase gain in the high frequency range, is not desirable.

Thus, the reflux fan for laser gas circulation in the excimer laser apparatus has particular problems, that is, reflux gas pressure is as high as up to 5000 hPa, output of the motor 211 driving rotary shaft 202 to rotate fan 203 under such a high pressure attains high and, as a result, negative spring constant Km increases, that a source of high frequency noise is positioned in the vicinity, and that it is difficult to ensure control stability of the magnetic bearing, as rotary shaft 202 becomes long.

Further, as rotary shaft 202 is long, bending natural frequency of rotary shaft 202 becomes lower, degrading controllability of the magnetic bearing, and in addition, there arises another problem that rotary shaft 202 tends to bend.

SUMMARY OF THE INVENTION

Therefore, an object of the present invention is to provide a structure of a reflux fan for an excimer laser apparatus enabling stable magnetic bearing control, not increasing the gain of the magnetic bearing even when the motor is driven.

In summary, the present invention provides a structure of a reflux fan for an excimer laser apparatus in which laser gas in a chamber is circulated by rotation of a fan driven by a motor, wherein a rotary shaft which is rotated by a motor driving force and on which the fan is attached is supported in a non-contact manner by a control type magnetic bearing, the rotary shaft is supported by a protective bearing when the control type magnetic bearing is unable to support the rotary shaft, the control type magnetic bearing includes a radial magnetic bearing including three radial electromagnets placed at three positions along the axial direction and position detection sensors arranged near respective radial electromagnets, and an axial magnetic bearing including one axial electromagnet and at least one permanent magnet, the axial electromagnet is positioned opposing to one end surface of the rotary shaft and the permanent magnet is arranged opposing to the other end surface of the rotary shaft, the first radial magnetic bearing among the radial magnetic bearings is arranged near the axial electromagnet, the second radial magnetic bearing is positioned on one side to the rotary shaft than the permanent magnet arranged opposing to the end surface of the rotary shaft, and the third radial magnetic bearing is arranged between the motor and the fan.

Therefore, according to the present invention, two radial magnetic bearings are arranged on opposing sides of the rotary shaft, and the negative spring element of the motor is corrected by the motor side radial magnetic bearing. Thus, stable magnetic bearing control becomes possible while not increasing the magnetic bearing gain when the motor is driven.

More preferably, the protective bearing includes a first protective bearing supporting both axial and radial directions of the rotary shaft and arranged near the axial electromagnet and the motor, and a second protective bearing supporting only the radial direction of the rotary shaft and arranged near the other radial electromagnet.

More preferably, the structure further includes a third protective bearing arranged between the third radial magnetic bearing and the fan and capable of supporting only the radial direction.

More preferably, a soft magnetic material is provided at a portion where the rotary shaft opposes to the axial magnetic bearing, and except for the soft magnetic material, the rotary shaft has its diameter made equal to or smaller than the each inner diameter of the first radial magnetic bearing, the second radial magnetic bearing and the third radial magnetic bearing from the side of the axial electromagnet to the side of the permanent magnet.

Therefore, by removing from a housing the axial electromagnet and the first protective bearing or a housing for the protective bearing fixing the first protective bearing, and further removing the soft magnetic material of the rotary shaft opposing to the axial electromagnet, the stator and the fan from the rotary shaft, it is possible to remove the rotary shaft to the outside of the chamber and the housing, with the housing not removed from the chamber.

More preferably, the radial magnetic bearing has 8 magnetic poles in the circumferential direction, to generate electromagnetic force on the rotary shaft by adjacent to magnetic poles or, alternatively, includes four magnetic bearings in the circumferential direction and corresponding magnetic poles along the axial direction to be paired with the respective magnetic poles, and by a set of two magnetic poles adjacent in the axial direction, an electromagnetic force is caused to act on the rotary shaft, each radial magnetic bearing has two control axes and each control axis supports the weight of the rotary shaft itself.

According to another aspect, the present invention provides a structure of a reflux fan for an excimer laser apparatus in which laser gas in a chamber is circulated by rotation of a fan driven by a motor, wherein a rotary shaft rotated by the motor driving force is supported in a non-contact manner by a control type magnetic bearing, the rotary shaft is supported by a protective bearing when the control type magnetic bearing is unable to support the rotary shaft, the control type magnetic bearing includes a radial magnetic bearing including radial electromagnets arranged at two positions along the axial direction and position detection sensors arranged near respective radial electromagnets, and an axial magnetic bearing including one axial electromagnet and at least one permanent magnet, the axial electromagnet is arranged opposing to one end surface of the rotary shaft and the permanent magnet is arranged opposing to the other end surface of the rotary shaft, one radial electromagnet of the radial magnetic bearing is arranged close to the axial electromagnet, and the other radial electromagnet is arranged on the rotary shaft inner than the permanent magnet arranged opposing to the end surface of the rotary shaft.

Preferably, the protective bearing includes a first protective bearing arranged close to the axial electromagnet and the motor and supporting both the axial and radial directions of the rotary shaft, and a second protective bearing arranged near the other radial electromagnet and supporting only the radial direction of the rotary shaft.

Preferably, the structure further includes a third protective bearing arranged between the motor and the fan.

Preferably, at a portion of the rotary shaft opposing to the axial electromagnet, a soft magnetic material is provided, and except for the soft magnetic material, the rotary shaft has its diameter made equal to or smaller than the each inner diameter of the first radial magnetic bearing and second radial magnetic bearing from the side of the axial electromagnet to the side of the permanent magnet.

Thus, by removing the axial electromagnet and the first protective bearing or a housing for the protective bearing fixing the first protective bearing from a housing, and by removing the soft magnetic material of the rotary shaft opposing to the axial electromagnet, the stator and the fan from the rotary shaft, it becomes possible to remove the rotary shaft to the outside of the chamber and the housing, with the housing not removed from the chamber.

Further, according to another aspect, the present invention provides a structure for a reflux fan for an excimer laser apparatus in which laser gas in a chamber is circulated by rotation of a fan driven by a motor, wherein a rotary shaft rotated by a motor driving force and to which a fan is attached is supported in an non-contact manner by a control type magnetic bearing, the rotary shaft is supported by a protective bearing when the control type magnetic bearing is unable to support the rotary shaft, the control type magnetic bearing includes a radial magnetic bearing including radial electromagnets arranged at two positions along the axial direction and position detection sensors arranged around respective radial electromagnets, and an axial magnetic bearing including one axial electromagnet and at least one permanent magnet, the axial electromagnet is arranged opposing to one end surface of the rotary shaft and the permanent magnet is arranged opposing to the other end surface of the rotary shaft, the motor is arranged close to the axial electromagnet, the radial electromagnet of one radial magnetic bearing is positioned between the motor and the fan and the other radial electromagnet is positioned on inner side of the rotary shaft than the permanent magnet arranged opposing to the end surface of the rotary shaft.

Further, according to a still further aspect, the present invention provides a structure of a reflux fan for an excimer laser apparatus in which laser gas in a chamber is circulated by rotation of a fan driven by a motor, wherein a rotary shaft rotated by motor driving force and on which the fan is attached is supported in a non-contact manner by a control type magnetic bearing, and the rotary shaft includes a portion of an austenitic stainless steel, and a magnetic body portion fixed at a position on the surface of the austenitic stainless steel portion opposing to the electromagnet of the magnetic bearing.

More preferably, the rotary shaft is annealed at a temperature of at least 300° C. with the magnetic body portion fixed.

More preferably, a material having Ni equivalent of (% Ni+30×% C+0.5×% Mn) of at least 16 and Cr equivalent given by (% Cr+% Mo+1.5×% Si+0.5×% Nb) of at least 18 is used for the rotary shaft.

According to a still further aspect, the present invention provides a structure of a reflux fan for an excimer laser apparatus in which laser gas is circulated in a chamber by rotation of a fan driven by a motor, wherein a rotary shaft rotated by a motor driving force is supported in a non-contact manner by a control type magnetic bearing, the rotary shaft is supported by a protective bearing when the control type magnetic bearing is unable to support the rotary shaft, and the control type magnetic bearing includes a radial electromagnet arranged in the axial direction of the rotary shaft and formed by sealing a coil with a metal that is corrosion resistant against the laser gas and a position detection sensor arranged around each radial electromagnet and formed by sealing a sensor unit with a metal that is corrosion resistant against the laser gas.

More preferably, the radial magnetic bearing includes a pair of magnetic bodies having a disk shape with a through hole formed at the center through which the rotary shaft is inserted, a plurality of coils arranged parallel to the axial direction between a pair of magnetic bodies, and a cylindrical member formed of a metal having corrosion resistance against the laser gas and sealing the periphery of the through hole of the magnetic body.

More preferably, the radial magnetic bearing includes a cylindrical magnetic body having protrusions on an inner portion, and a coil having its outer periphery sealed by a metal having corrosion resistance against the laser gas and inserted into the protrusion of the magnetic body.

Preferably, the radial magnetic bearing includes a ring-shaped nonmagnetic body, and a coil sealed by a metal tube having corrosion resistance against the laser gas and arranged at every prescribed angle, on the nonmagnetic body.

More preferably, the position sensor includes a disk shaped magnetic body having a through hole at the center through which the rotary shaft is inserted and a plurality of holes formed from the outer peripheral surface to the center, sensor unit inserted to the plurality of holes, and a cylindrical member formed of a metal having corrosion resistance against the laser gas and sealing the periphery of the through hole.

More preferably, the structure further includes a first housing provided on one side along the direction of the rotary shaft in the chamber, and a second housing provided on the other side, the radial electromagnet and the position detection sensor include a first radial electromagnet and a first position detection sensor provided in the first housing, and a second radial electromagnet and a second position detection sensor provided in the second housing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A and 6B represent transfer function from Fa to x when G2(s) is formed only of differential element.

FIGS. 8A and 8B represent transfer function from Fa to x when G2(s) is formed both of proportional and differential elements.

FIGS. 21A and 21B represent transfer function from Fa to x when G2(s) is formed only of differential element.

FIGS. 22A and 22B represent transfer function from Fa to x when G2(s) is formed both of proportional and differential elements.

DESCRIPTION OF THE PREFERRED EMBODIMENTS

Figure 1:
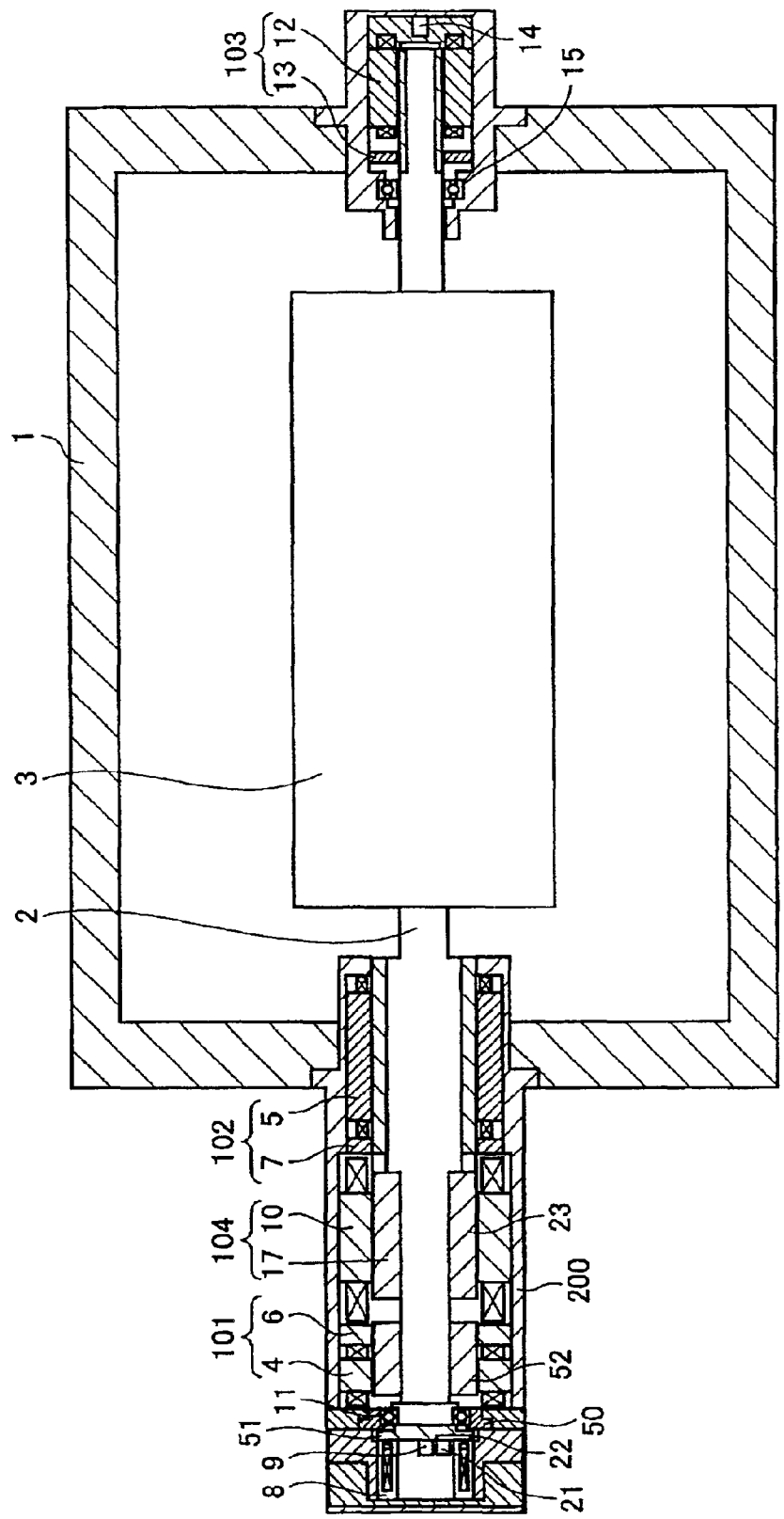
FIG. 1 is a vertical sectional view of the reflux fan for an excimer laser apparatus in accordance with a first embodiment of the present invention.

FIG. 1 is a vertical cross sectional view of a reflux fan for an excimer laser apparatus in accordance with the first embodiment of the present invention. Referring to FIG. 1, a laser gas is sealed in a chamber 1, and a fan attached on a rotary shaft 2 rotates in chamber 1. Magnetic bearings supporting rotary shaft 2 are arranged on opposing sides of chamber 1. On the left side of FIG. 1, there are two radial magnetic bearings 101 and 102, an axial electromagnet 8 as a part of an axial magnetic bearing, a position sensor 9, a motor stator 10 included in motor 104, and a protective bearing 11.

Radial magnetic bearing 101 includes a radial electromagnet 4 and a position sensor 6, while radial magnetic bearing 102 includes a radial electromagnet 5 and a position sensor 7. Protective bearing 11 supports rotary shaft 2 in radial and axial directions, and supports rotary shaft 2 when radial magnetic bearing 101 and 102 are inoperative, or in a case of malfunction, or when there is a significant disturbance on the rotary shaft 2 so that radial magnetic bearings 101 and 102 cannot support rotary shaft 2 in a non-contact manner.

On the right side of FIG. 1, there are a radial magnetic bearing 103 including a radial electromagnet 12 and a position sensor 13, a permanent magnet 14 on a stator side as a part of the axial magnetic bearing, and a protective bearing 15 enabling support only in the radial direction and an attracting mechanism formed of a magnetic body on a rotary shaft side.

Here, inner diameters of protective bearing 11, motor stator 10 and radial electromagnets 4, 5 are adjusted to be approximately coaxial. A gap between the inner diameter of protective bearing 11 and the opposing rotary shaft is set to be slightly smaller than the minimum dimension of the gap between each inner diameter of radial electromagnets 4 and 5 and the opposing rotary shaft, so as to prevent contact between rotary shaft 2 with motor 104 and electromagnet member.

Similarly, protective bearing 15 is adjusted to be approximately coaxial with the inner diameter of radial electromagnet 12. The gap between the inner diameter of protective bearing 15 and the opposing rotary shaft 2 is set to be slightly smaller than the gap between the inner diameter of radial electromagnet 12 and the opposing rotary shaft 2, so as to prevent contact between rotary shaft 2 and the electromagnet member.

Figure 2:
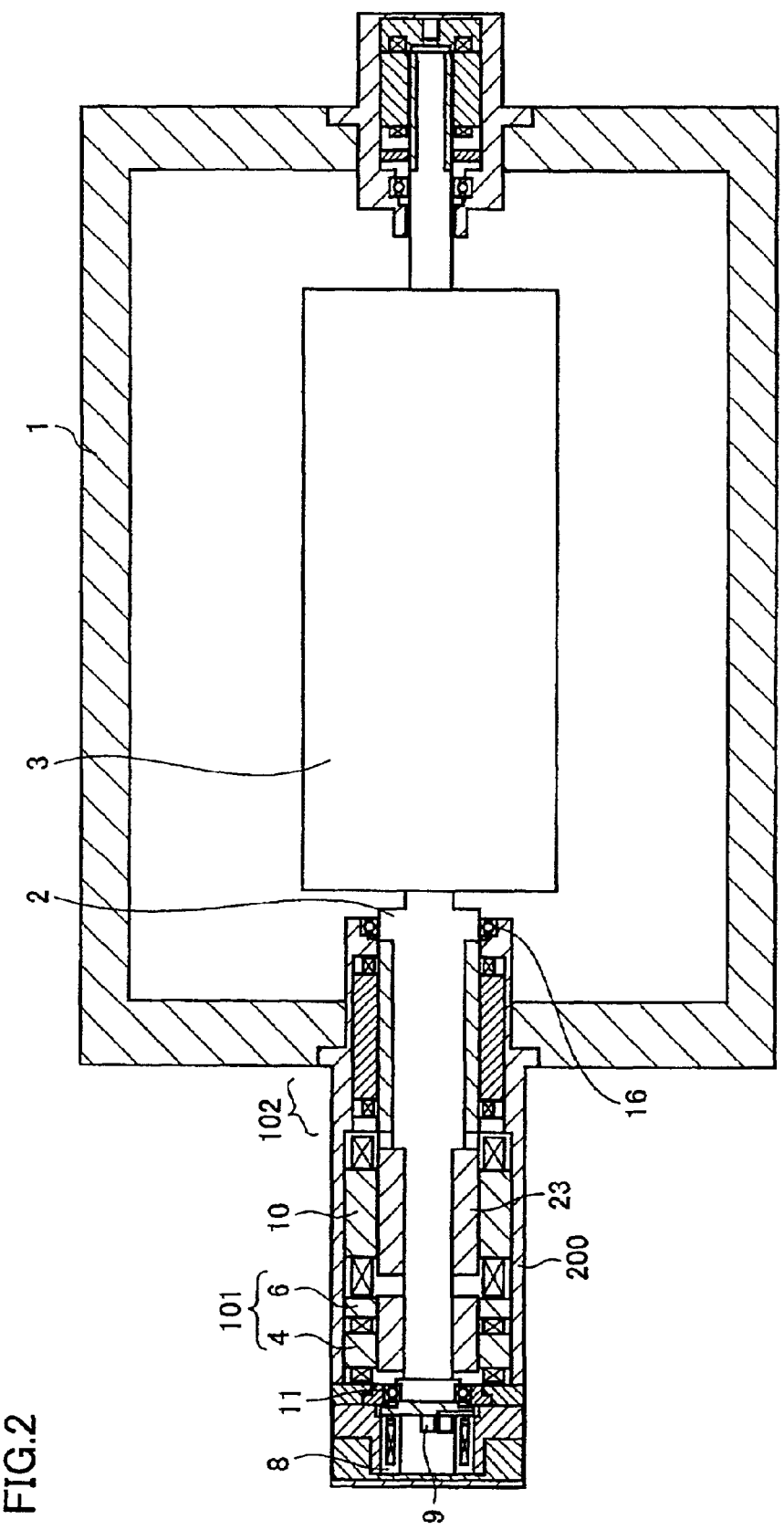
FIG. 2 is a vertical sectional view of the reflux fan for an excimer laser apparatus in accordance with a second embodiment of the present invention.

Though two protective bearings are arranged in FIG. 1, a third protective bearing 16 may be arranged in between, considering the fact that the rotary shaft is long. A second embodiment as such is shown in FIG. 2.

Each magnetic bearing detects a position of the rotary shaft by corresponding position sensor. An output of each position sensor and an instruction value are compared, resulting in a signal which has its phase compensated by a control circuit, not shown, and current-amplified by a power amplifier, whereby a current is caused to flow in the coil of the electromagnet, so that rotary shaft 2 is axially supported by radial magnetic bearings 101, 102 and 103 as well as by the axial magnetic bearing, in a non-contact manner. Here, radial magnetic bearing 102 is used to compensate for the negative spring element of the motor. A control circuit used for radial magnetic bearings 101 and 103 is generally formed by proportional and differential elements and, by an additional integral element, a constant position control with small deviation from an instruction value is realized, whereby rotary shaft 2 is supported. Radial magnetic bearing 102 has its control circuit formed only by proportional and differential elements, compensates for the negative spring element of motor 104, and, in addition, improves controllability of radial magnetic bearing 101.

Figure 3:
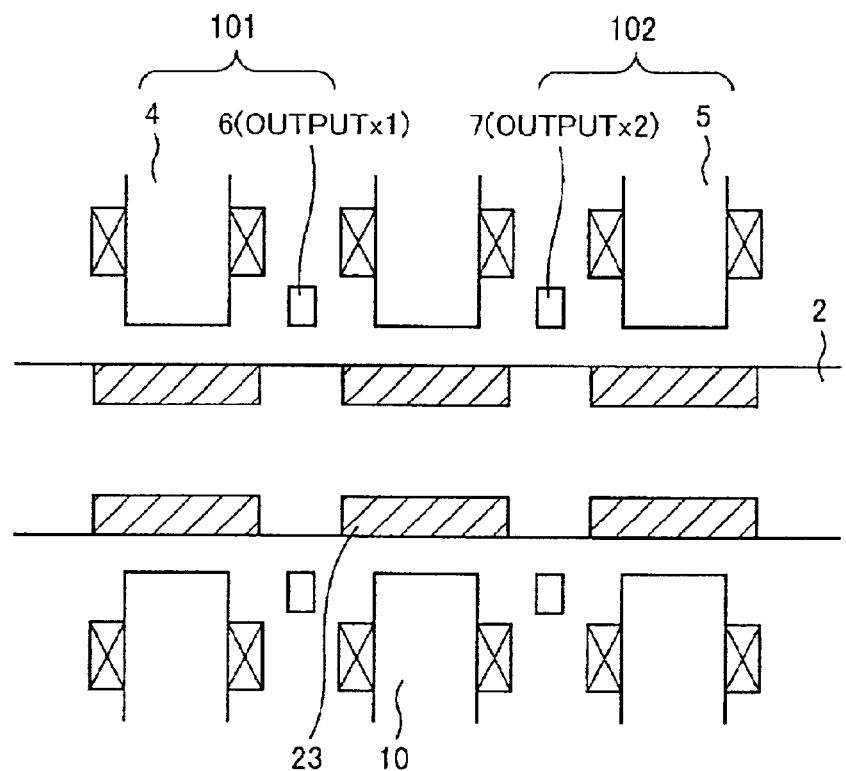
FIG. 3 is a schematic diagram of a radial magnetic bearing and a motor.
Figure 4:
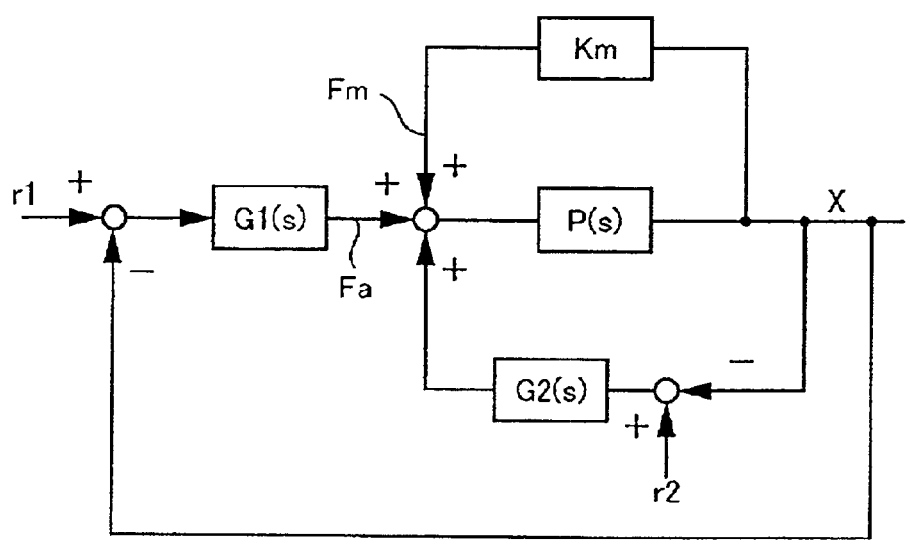
FIG. 4 is a block diagram of a control system of a rotary shaft including the radial magnetic bearing and the motor.

FIG. 3 is a schematic diagram of radial magnetic bearing 101, motor 104 and radial magnetic bearing 102, and FIG. 4 is a block diagram of the control system of the rotary shaft including radial magnetic bearing 101, motor 104 and radial magnetic bearing 102. FIGS. 5 to 8A and 8B are Bode diagrams of the object of control of radial magnetic bearing 101.

Next, the effect attained by the provision of two radial magnetic bearings 101 and 102 will be described.

Referring to FIG. 3, rotary shaft 2 for the reflux of excimer gas in the excimer laser apparatus is long as shown in FIG. 1, and therefore, when rigid body mode of rotary shaft 2 is considered, an output x1 of position sensor 6 and an output x2 of position sensor 7 detecting rotary shaft 2 have approximately the same value. Utilizing this fact, in FIG. 4, a block diagram is depicted in which displacement of rotary shaft 2 is represented by x. For simplicity, sense amplifier is omitted.

In FIG. 4, P(s) represents an object of control of radial magnetic bearing 101 when not influenced by motor 104, G1(s) represents a control circuit of radial magnetic bearing 101, G2(s) represents a control circuit of radial magnetic bearing 102, Km represents a negative spring constant of motor 10, r1 represents an instruction value of radial magnetic bearing 101 and r2 represents an instruction value of radial magnetic bearing 102.

G1(s) includes proportional, integral and differential elements. The object of control P(s) of the magnetic bearing is represented as $1/(Ms^2-K)$. Here, there is also a negative spring constant in magnetic bearing, and K corresponds to the negative spring constant. Therefore, the object of control in consideration of the influence of motor 104 and the influence of radial magnetic bearing 102, that is, transfer function from Fa to x will be $P1(s)=1/(Ms^2-K-Km+G2(s))$.

Figure 5:
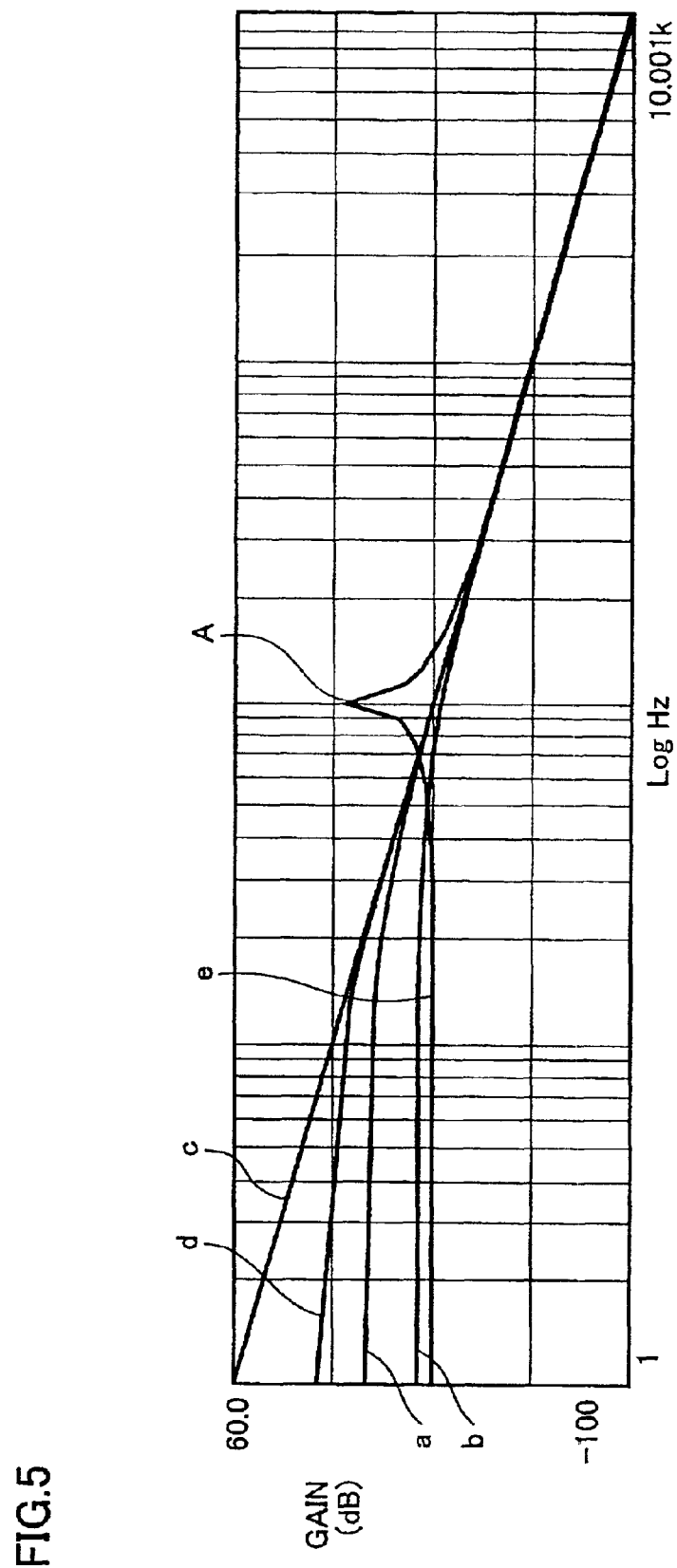
FIG. 5 represents transfer function from Fa to x when G2(s) is formed only of proportional element.

Here, FIG. 5 shows transfer function (only the gain curve) from Fa to x when G2(s) consist only of proportional element.

Referring to FIG. 5, a solid line a represents transfer function $P1(s)=1/(Ms^2-K)$) when there is no influence of motor (Km=0) and G2(s)=0, solid line b represents transfer function $(P1(s)=1/(Ms^2-K-Km))$ when there is an influence of motor and G2(s)=0, solid line c represents transfer function $(P1(s)=1/Ms^2)$ when there is an influence of motor 104 and G2(s)=(K+Km), solid line d represents transfer function $(P1(s)=1/(Ms^2-K-Km+Ky))$ when there is an influence of motor 104, G2(s)=Ky and 0<Ky<(K+Km), and solid line e represents transfer function $(P1(s)=1/(Ms^2-K-Km+Ke))$, when there is an influence of motor 104 and G2(s)=Ke, Ke>(K+Km).

From FIG. 5, when the control circuit of radial magnetic bearing 102 is formed only by the proportional element, it is understood that the gain of the low frequency range of control object P1(s) of the radial magnetic bearing 101 can be increased when the gain of the proportional element is at least 0 and at most (K+Km).

When the gain of the proportional element is set to be (K+Km) or higher, there would be a peak (FIG. 5A) on the control object P1(s) of radial magnetic bearing 101, degrading the magnetic bearing controllability.

In this manner, by forming the control circuit of radial magnetic bearing 102 only by the proportional element and setting the gain of the proportional element to be at least 0 and at most (K+Km), the gain in the low frequency range of control object P1(s) of the radial magnetic bearing can be increased and, as a result, stability of the magnetic bearing can be improved.

FIGS. 6A and 6B represent transfer function from Fa to x when G2(s) is formed only by the differential element. Particularly, FIG. 6A represents gain characteristic and FIG. 6B represents phase characteristic. Referring to FIGS. 6A and 6B, a solid line a represents transfer function $(P1(s)=1/(Ms^2-K-Km))$ when there is an influence of the motor and G2(s)=0, and solid lines b, c, d and e represent transfer functions $(P1(s)=1/(Ms^2+cs-K-Km))$ when there is an influence of motor 104 and G2(s)=cs with the value c increased. Here, c is referred to as differential gain.

From 6A, it is understood that as the value c increases, the gradient of the gain flat portion in the low frequency range of the control object P1(s) of radial magnetic bearing 101 increases, and the phase comes to exhibit an advanced phase characteristic. More specifically, when the control circuit of the magnetic bearing is formed by differential element, it is possible to improve the gain curve in the low frequency range and, at the same time, the phase is advanced, and therefore, control performance of radial magnetic bearing 101 is improved significantly.

Figure 7A:
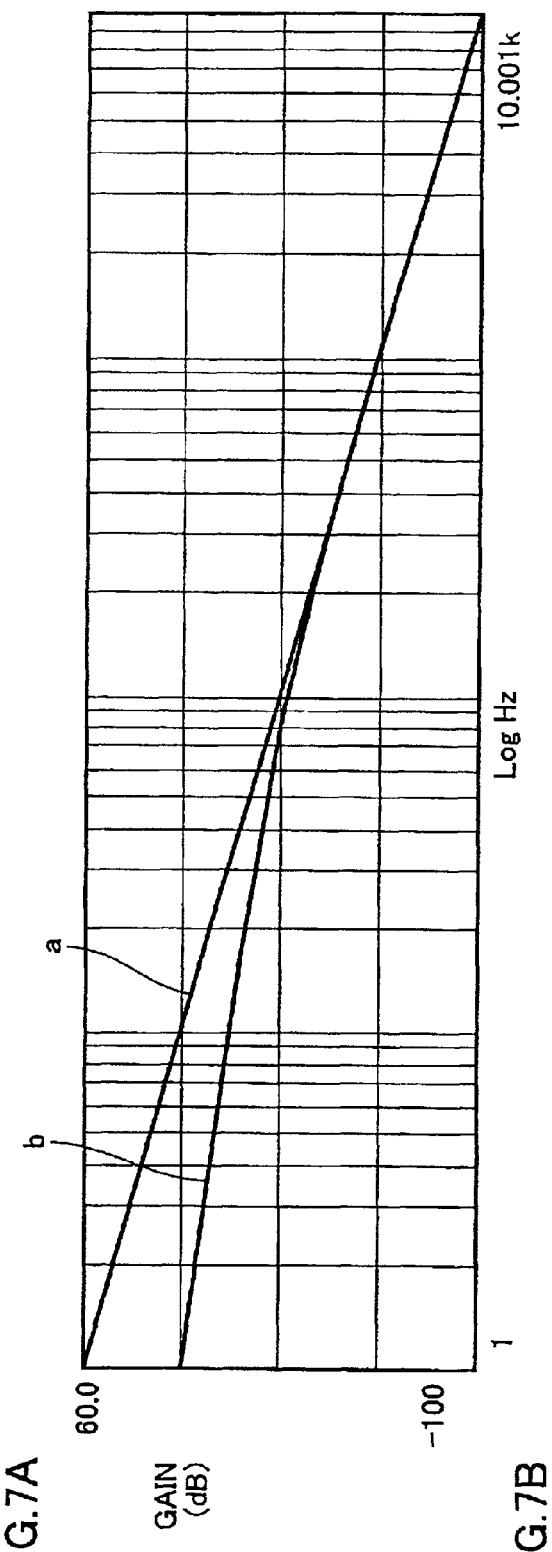
FIGS. 7A and 7B represent transfer function from Fa to x when G2(s) is formed both of proportional and differential elements.
Figure 7B:
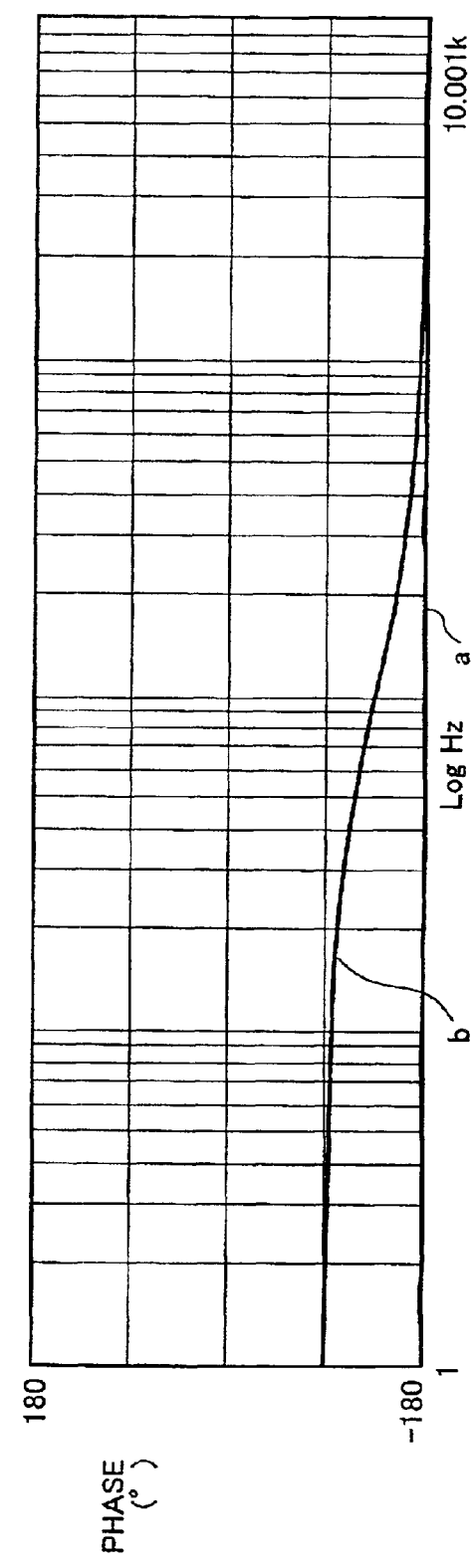

FIGS. 7A and 7B as well as FIGS. 8A and 8B represent transfer function from Fa to x, when G2(s) is formed both of proportional and differential elements.

In FIGS. 7A and 7B, solid line a represents an example which does not include any differential element, for comparison, representing transfer function (P(s)=1/Ms2) when there is an influence of motor 104 and G2(s)=(K+Km). Solid line b represents transfer function (P1(s)=1/(Ms2+cs) when there is an influence of motor and G2(s)=(cs+K+Km).

As the differential element is introduced, the gradient of the gain curve on the low frequency side becomes smaller, while the phase in the low frequency range can be advanced. More specifically, when the control circuit of the radial magnetic bearing is formed by proportional and differential elements, the gain curve in the low frequency range can be improved and, at the same time, the phase can be advanced, and hence control performance of radial magnetic bearing 101 is significantly improved.

Further, referring to FIGS. 8A and 8B, solid line a represents transfer function (P1(s)=1/(Ms2−K−Km+Ke)) when there is an influence of motor 104 and G2(s)=Ke, Ke>(K+Km), and solid line b represents transfer function (P1(s)=1/(Ms2+cs−K−Km+Ke)), when there is an influence of motor 104 and G2(s)=cs+Ke, Ke>(K+Km).

In FIGS. 8A and 8B, the solid line a has a maximum value on the gain curve. By introducing the differential element, the characteristic can be improved and, at the same time, the phase is advanced. Namely, even when a control circuit of the radial magnetic bearing 102 has a proportional constant Ke which is not smaller than a sum of the negative spring constant of the magnetic bearing and the negative spring constant of motor 104, the peak appearing on the gain curve can be suppressed and advanced phase characteristic can be obtained by adding the differential element, and the control performance of radial magnetic bearing 101 can significantly be improved.

In the foregoing, the spring element of motor 104 has been considered constant. Actually, however, it changes dependent on the number of motor rotation or motor current. Referring to FIG. 1, a rotation sensor 21 is provided at an end of the rotary shaft. The rotary sensor 21 is formed of a magnetic sensor, and by forming a notch 22 on the opposing surface of the rotary shaft, the number of rotation of rotary shaft 2 can be measured. Utilizing the measured number of rotation, it becomes possible to always perform optimal control, by changing the transfer function G2(s) of the control circuit of radial magnetic bearing 102.

Generally, as the number of rotation increases, the negative spring constant Km of motor 104 increases, and therefore, it is preferable to increase the proportional gain of G2(s). Further, as the motor current value increases, the negative spring constant of motor 104 increases. By changing the transfer function G2(s) of the control circuit of radial magnetic bearing 102 in accordance with the monitored current value of motor 104, it becomes possible to always perform optimal control. In either case, the transfer function G2(s) may be changed continuously in accordance with the number of rotation or the motor current value, or may be changed stepwise.

It is preferred to use software control employing CPU or DSP as control means, to change the manner of control in accordance with the number of rotation or motor current value.

Further, as the rotary shaft 2 is long, it is difficult to ensure degree of coaxiality of the surfaces of radial magnetic bearings 101, 102, and 103 facing the electromagnets and the surfaces facing positional sensors 6, 7 and 13, respectively. Therefore, when rotary shaft 2 is supported by radial magnetic bearings 101 and 103 as the base for the support of the rotary shaft and the rotary shaft 2 is rotated, there is a high possibility that whirl generates in synchronization with the rotation or in a period of integer multiple thereof, at the rotary shaft portion of radial magnetic bearing 102. When radial magnetic bearing 102 is controlled in this state, the controlling force will be, at high possibility, a disturbance to radial magnetic bearings 101 and 103, so that stable rotation cannot be attained. Therefore, by selectively removing the rotational synchronization component or a high order component thereof in the radial magnetic bearing 102, it becomes possible to attain stable rotation and magnetic bearings supporting performances.

Here, the method of selectively removing the rotational synchronous components or higher order component thereof is not limited. A method using a switch capacitor filter or a method in which such selective removal is incorporated in the software control mentioned above may be used.

In FIG. 1, the control circuit of radial magnetic bearing 102 is formed of proportional and differential elements. It is also possible to provide control circuit of radial magnetic bearing 101 with proportional and differential elements, and to perform constant position control with a small deviation from an instruction value by providing radial magnetic bearing 102 with integral element, so as to support the rotary shaft 2. In that case, protective bearings 11 and 15 are indispensable.

By arranging three radial magnetic bearings, the size of the housing 200 containing magnetic bearings and motor 104 increases slightly, and output thereof increases slightly. As a result, it becomes difficult to remove housing 200 from chamber 1 in order to attach/detach the rotary shaft. In the embodiment shown in FIGS. 1 and 2, a structure that allows attachment/detachment of rotary shaft 2 without the necessity of removing housing 200 is implemented.

More specifically, a soft magnetic member 51 is fastened by means of a volt on rotary shaft 2 where it opposes to axial electromagnet 8, except for the soft magnetic member 51, rotary shaft 2 has its diameter made equal to or smaller than the inner diameter of radial magnetic bearings, from the side of axial electromagnet 8 to the side of permanent magnet 14. By removing axial electromagnet 8 and the first protective bearing 11 or a housing 50 for the protective bearing fixing the first protective bearing 11 from housing 200 and by further removing the soft magnetic member 51 and fan 3 from rotary shaft 2, it is possible to remove rotary shaft 2 out of chamber 1 and housing 200, with housing 200 not removed, from chamber 1.

Though a method of compensating for the influence of the motor has been described above, the influence of the motor itself may be eliminated, by using an eddy current motor that does not generate any attraction force between motor rotor 17 and motor stator 10.

Further, as three radial magnetic bearings are arranged, work for winding coils in the radial electromagnet increases, resulting in high cost. In a reflux fan for circulating laser gas in an excimer laser apparatus, the weight of rotary shaft 2 itself is heavy, and though current flows in the direction of supporting the weight of itself in the coil of radial magnetic bearings 101, 102 and 103, no current flows in the opposite direction. Further, as the weight of itself is heavy, the electromagnet coil current driving the weight is large, causing a problem of heat build up.

In order to reduce heat build up of the electromagnet coil and to reduce the number of windings of the coil, a method will be described, in which by utilizing unique arrangement of electromagnets and reducing the number of total windings of the coils of respective radial electromagnets, the number of coil winding turns are not increased even when three radial magnetic bearings are used.

Figure 9:
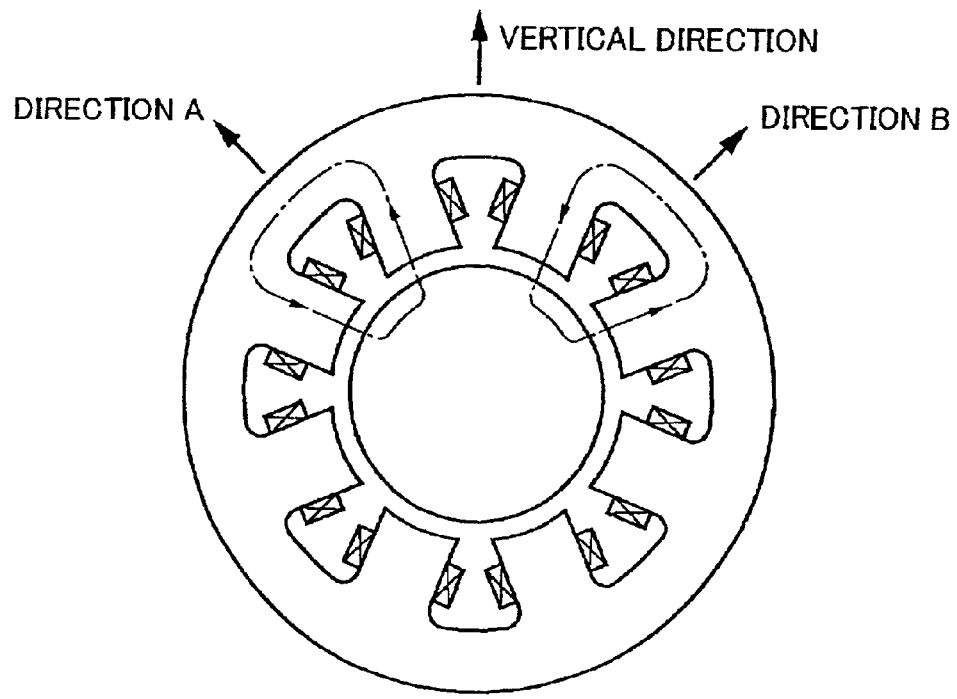
FIG. 9 is a cross sectional view of an electromagnet of a radial magnetic bearing having 8 magnetic poles in a circumferential direction.
Figure 10:
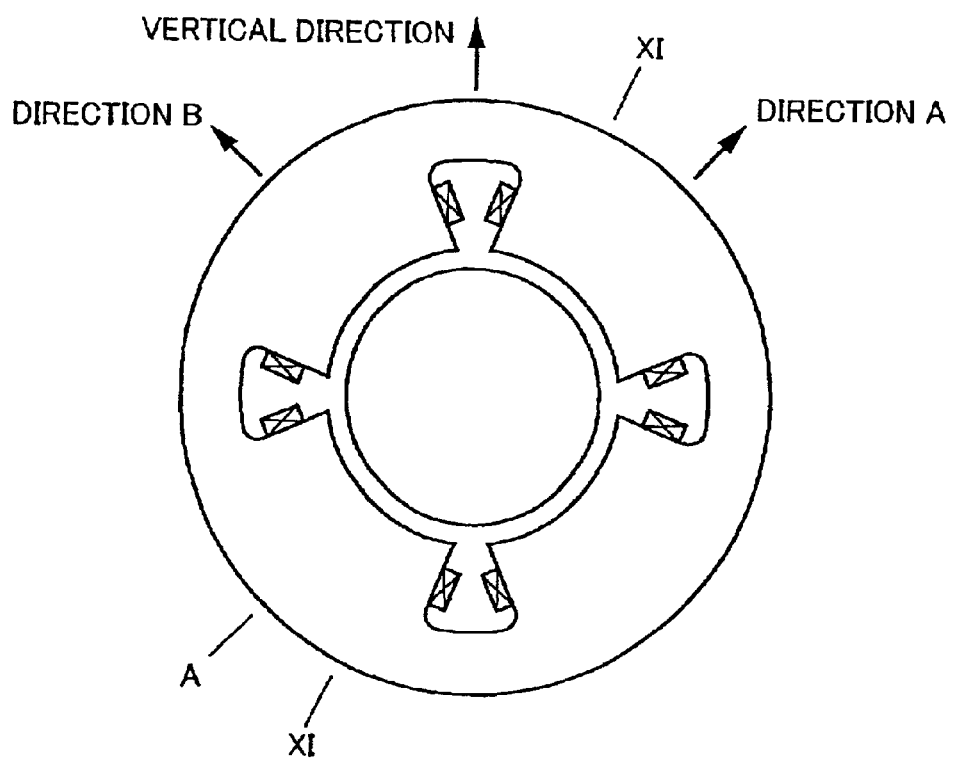
FIG. 10 is a cross section of an electromagnet of a radial magnetic bearing having four magnetic poles in the circumferential direction and corresponding four magnetic poles along the axial direction.
Figure 11:
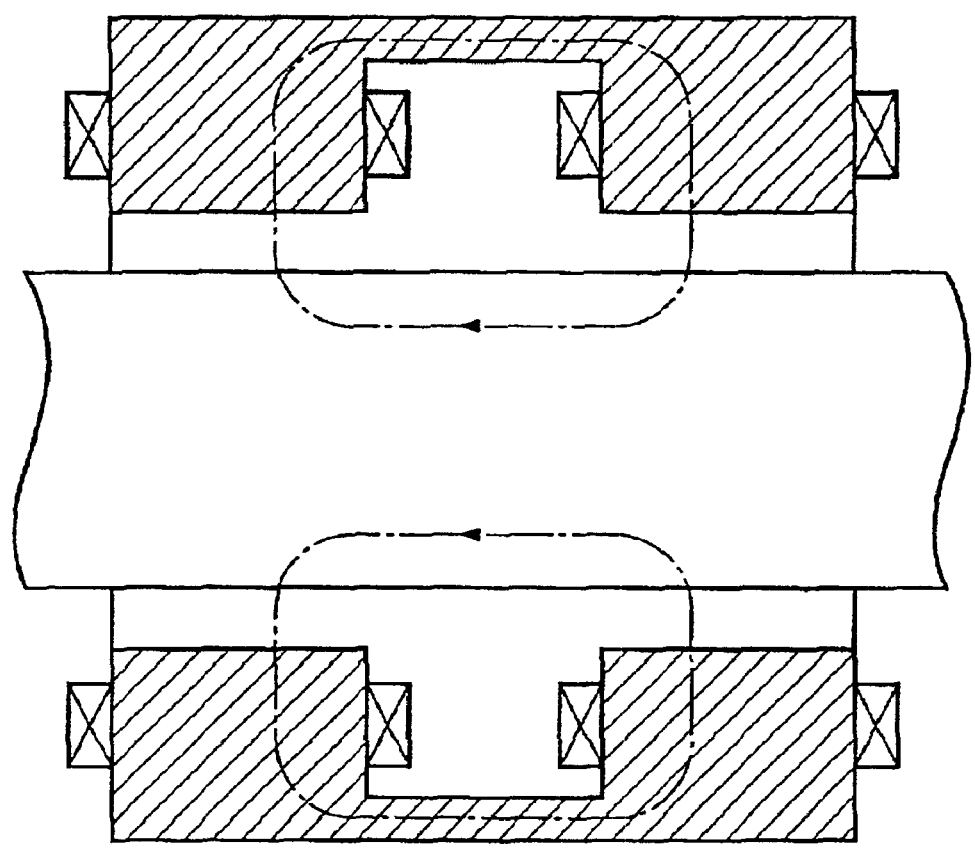
FIG. 11 is a cross sectional view taken along the line XI—XI of FIG. 10.

FIGS. 9 to 11 are cross sections of the electromagnet of the radial magnetic bearing. FIG. 9 shows an example in which there are 8 magnetic poles in the circumferential direction and by adjacent two magnetic poles, electromagnetic force is generated on rotary shaft 2. FIG. 10 shows an example in which there are four magnetic poles in the circumferential direction and corresponding four magnetic poles in the axial direction, and by a pair of adjacent magnetic poles along the axial direction, electromagnetic force is exerted on rotary shaft 2. FIG. 11 is a cross section taken along the line XI—XI of FIG. 10.

Referring to FIG. 10, directions A and B are arranged so that the self weight can be supported. More specifically, the direction of control axis of the radial electromagnet of each radial magnetic bearing is set to be 45°±22.5° with respect to the vertically upward direction, so that concentration of current to an electromagnet coil of one control axis is suppressed, and heat build up can be reduced. Further, it becomes unnecessary to wind a coil on the magnetic pole which does not support the self weight of the rotary shaft. Thus, the number of turns of coil winding can be reduced.

Figure 12:
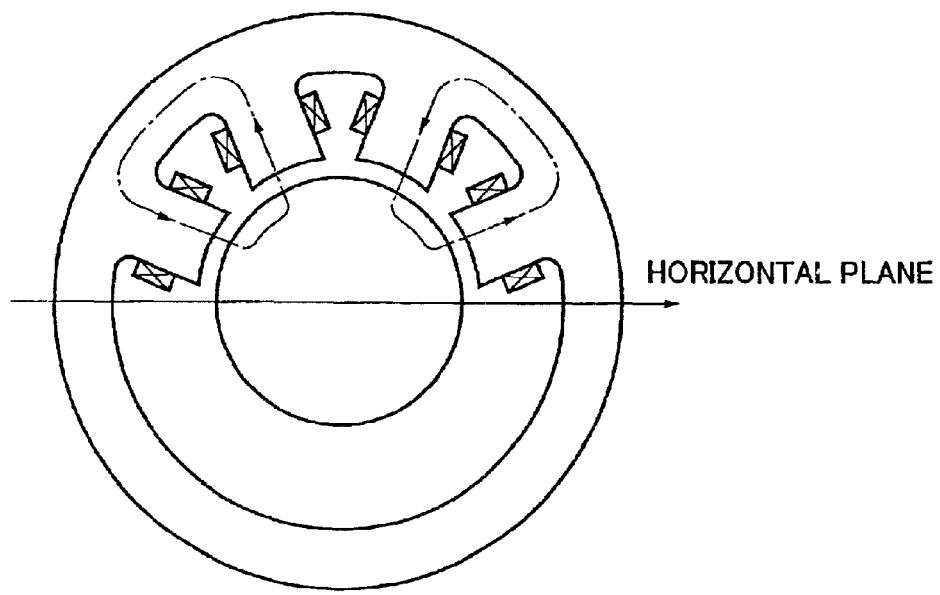
FIG. 12 shows an electromagnet of a radial magnetic bearing having 4 magnetic poles in the circumferential direction and generating electromagnet force on the rotary shaft by adjacent two magnetic poles.
Figure 13:
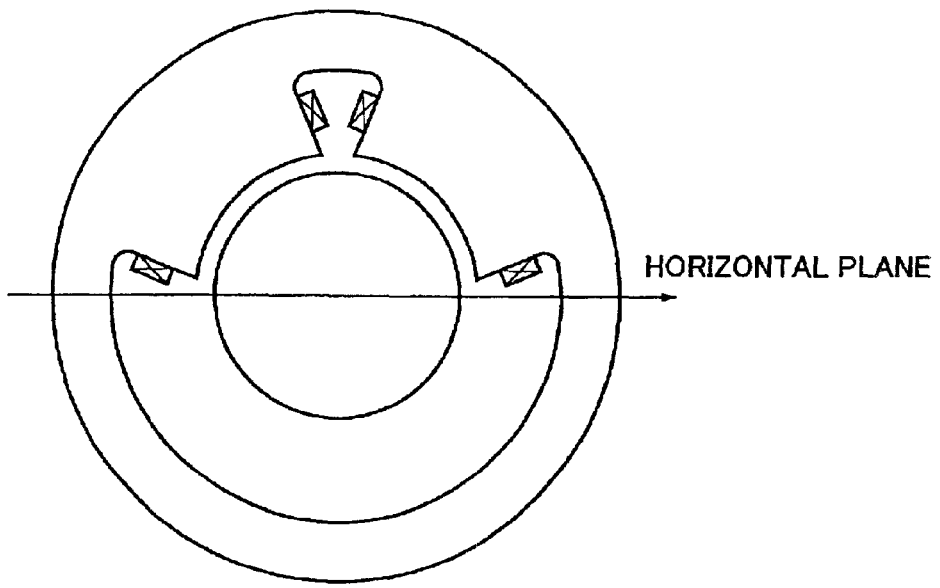
FIG. 13 shows an electromagnet of a radial magnetic bearing having two magnetic poles in the circumferential direction and corresponding two magnetic poles in the axial direction.

FIGS. 12 and 13 represent another example of the electromagnet of the radial magnetic bearing. FIG. 12 shows an example in which there are four magnetic poles in the circumferential direction and adjacent two magnetic poles generate electromagnetic force on the rotary shaft. FIG. 13 shows an example in which there are two magnetic poles in the circumferential direction and corresponding two magnetic poles in the axial direction, and by a set of two magnetic poles adjacent in the axial direction, electromagnetic force is exerted on the rotary shaft. The center of each magnetic pole may be arranged to be upper than the horizontal plane.

Figure 14:
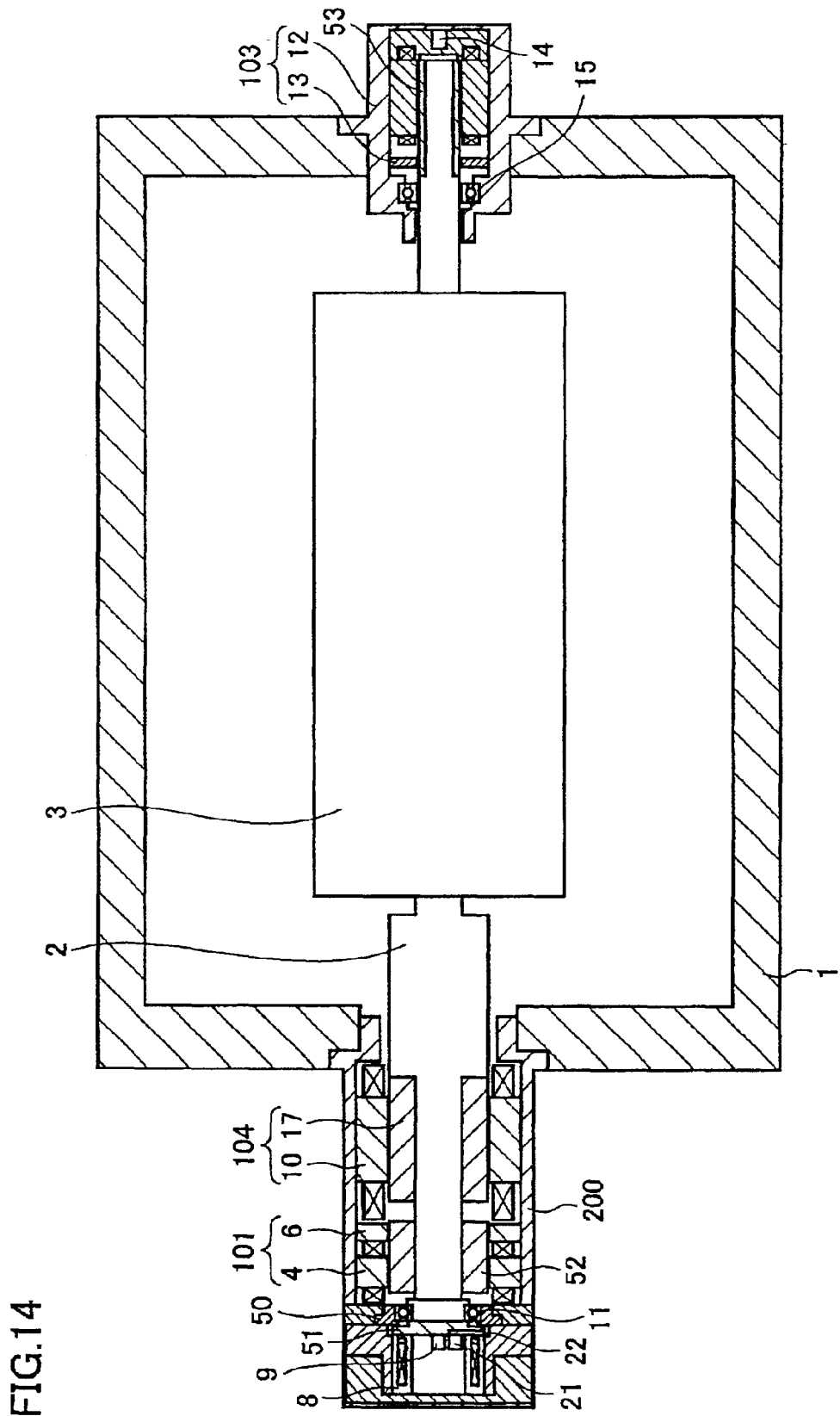
FIG. 14 is a vertical sectional view of a reflux fan for an excimer laser apparatus in accordance with a third embodiment of the present invention.
Figure 41:
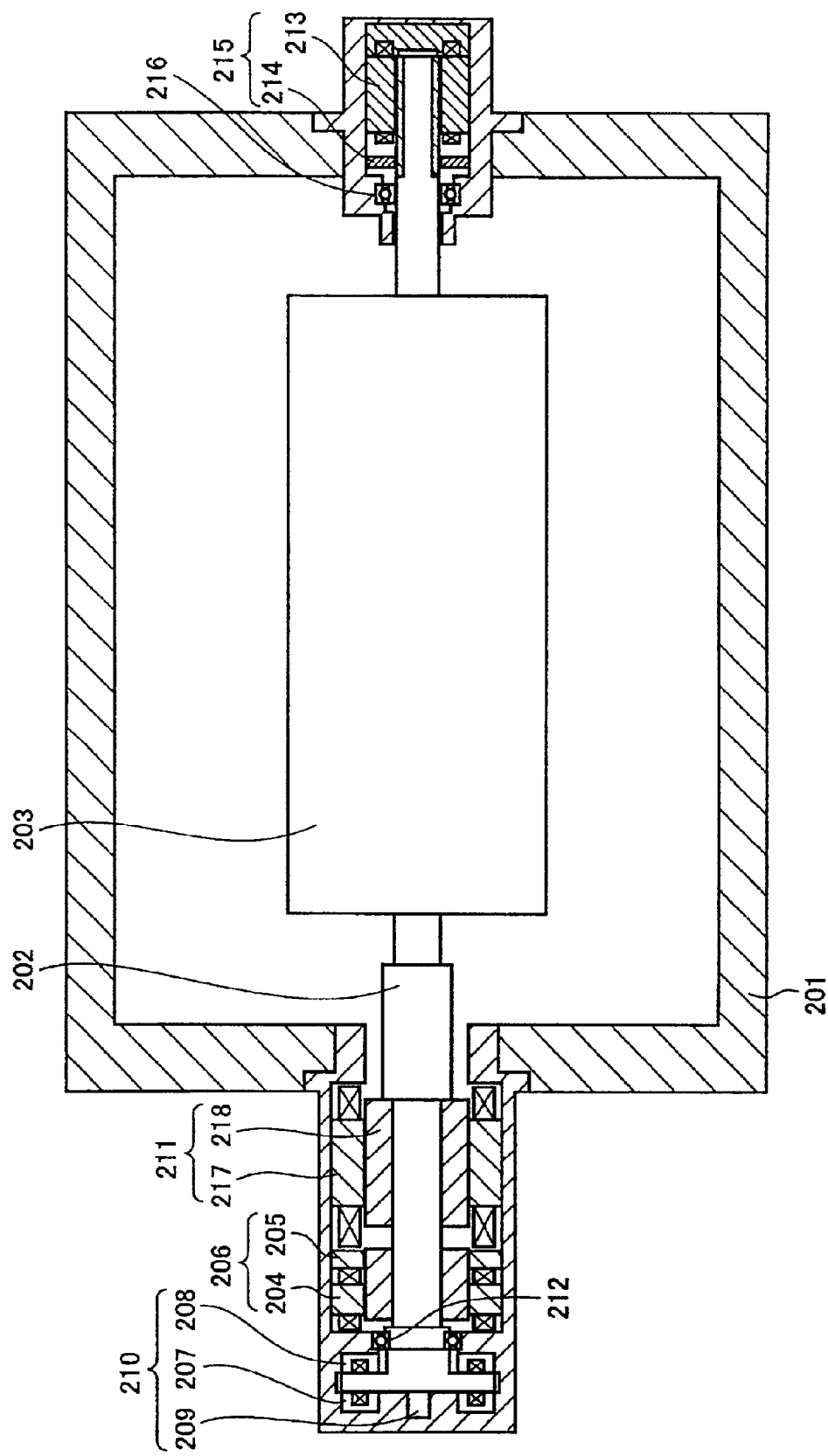
FIG. 41 is a cross sectional view of a fan and peripheral portion thereof, circulating an excimer gas.
Figure 42:
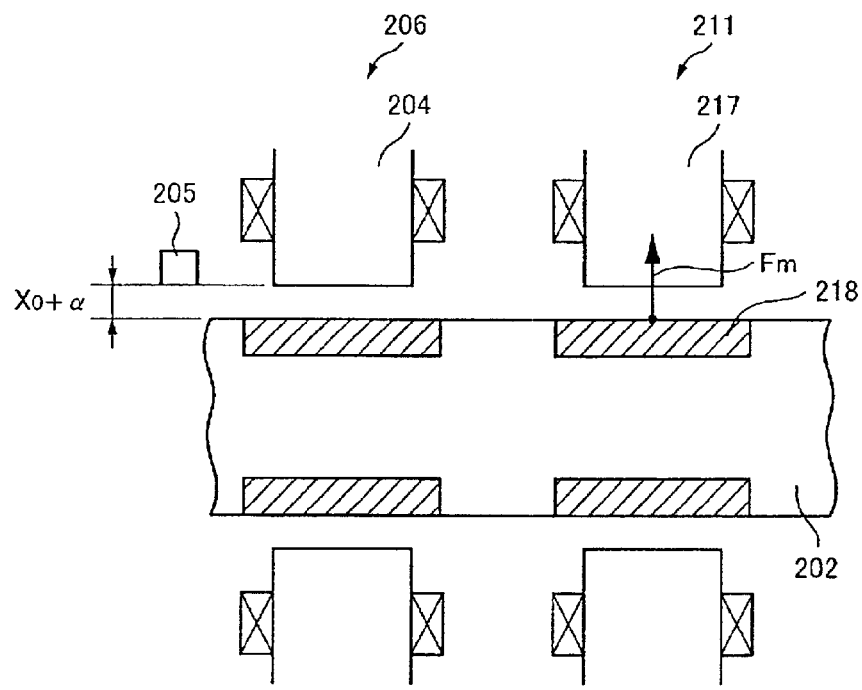
FIG. 42 represents a structure of a portion near the radial magnetic bearing.
Figure 43:
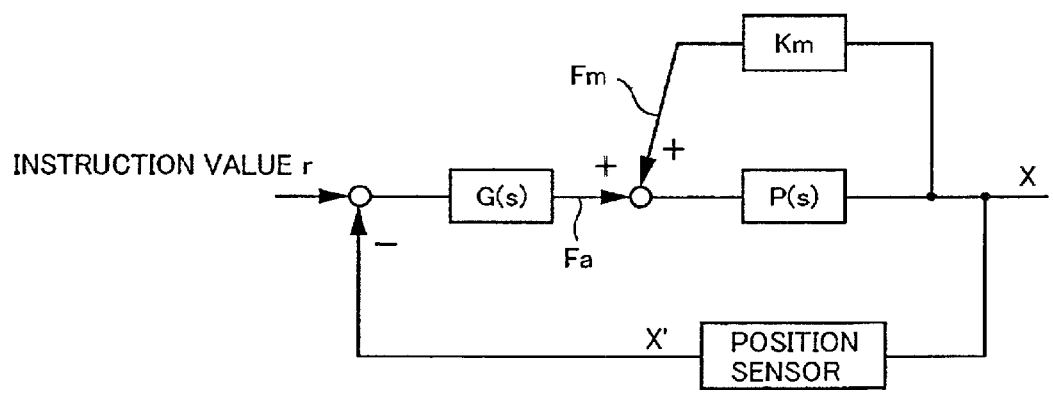
FIG. 43 is a block diagram representing a magnetic bearing control system representing influence of the motor shown in FIG. 42.
Figure 44:
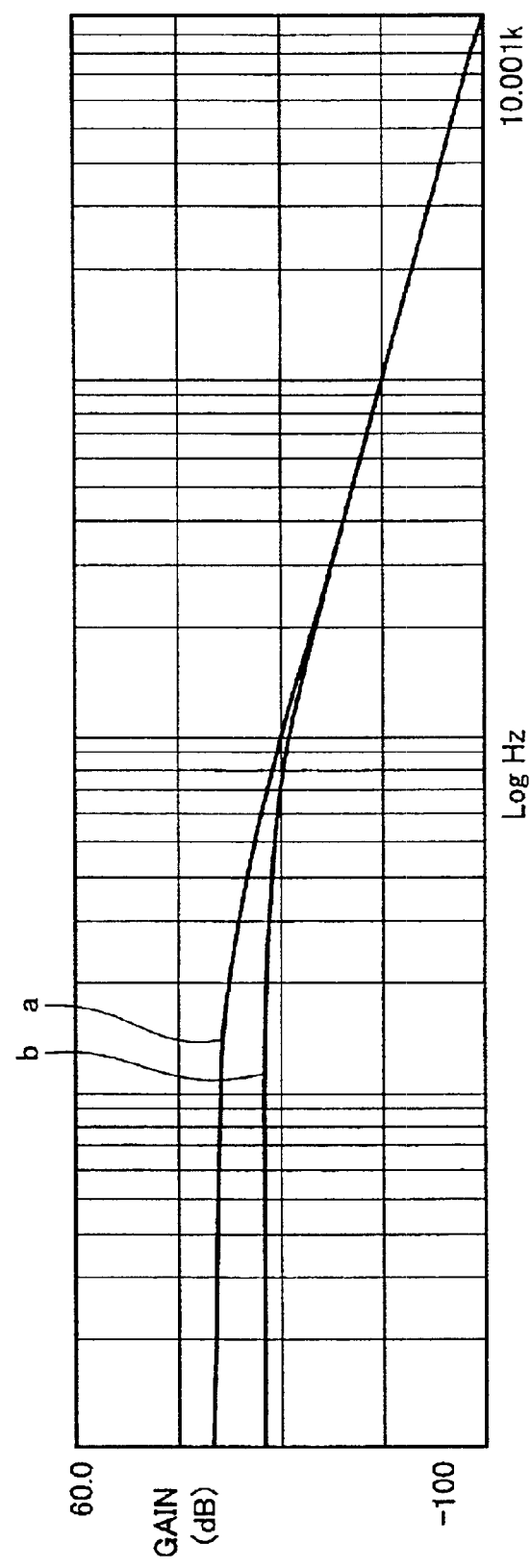
FIG. 44 represents gain curves of Bode diagram of the object of control of a magnetic bearing, when the motor is driven and not driven.
Figure 45A:
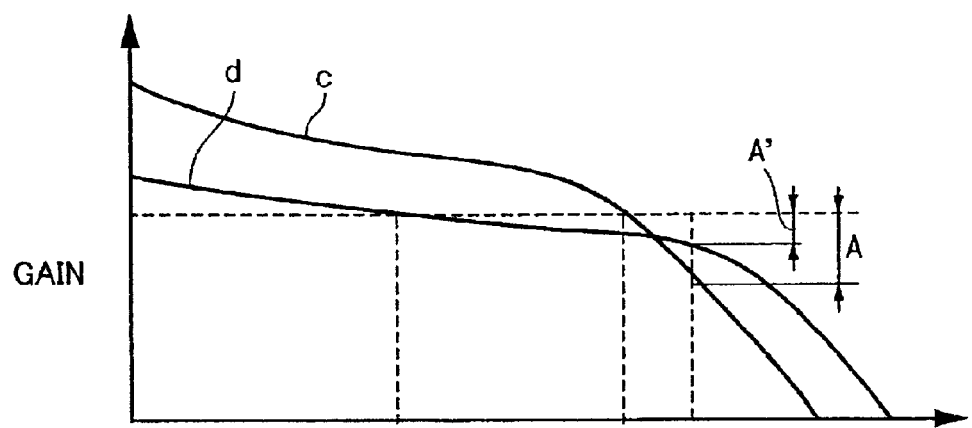
FIGS. 45A and 45B represent open loop transfer function, when a magnetic bearing control circuit is designed.
Figure 45B:
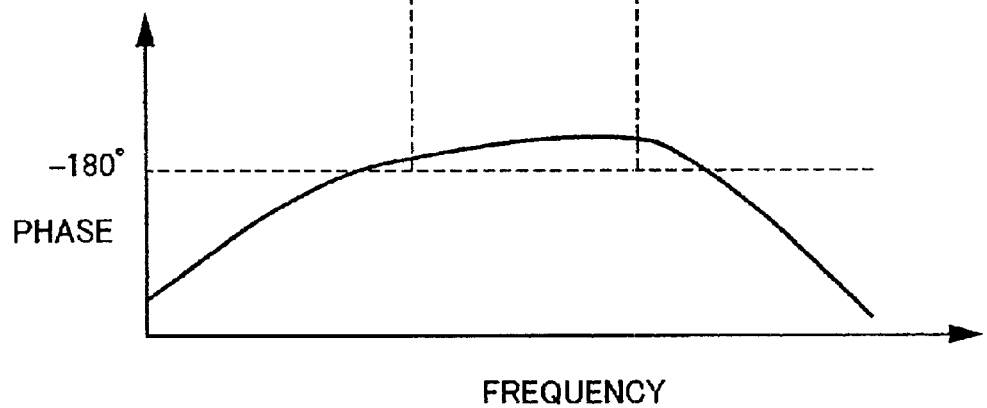

FIG. 14 is a vertical sectional view of a third embodiment of the present invention. In the prior art example shown in FIG. 41, two axial electromagnets 207 and 208 are used for axial magnetic bearing 210. In the present embodiment, balance between the attracting force of permanent magnet 14 and attracting force of axial electromagnet 8 is utilized for controlling the axial magnetic bearing, to reduce one axial electromagnet, whereby the apparatus can be reduced in size, a power circuit for driving the axial electromagnet coil becomes unnecessary, and hence the overall cost can be reduced.

Here, protective bearing 11, motor stator 10 and radial electromagnet 4 are adjusted to be approximately coaxial. The gap between the inner diameter of protective bearing 11 and the opposing rotary shaft 2 is set to be slightly smaller than the minimum dimension of the gap between respective inner diameters of motor stator 10 and radial electromagnet 4 and the opposing rotary shaft 2, so as to prevent contact between rotary shaft 2 with motor stator 10 and with its electromagnet member.

Similarly, protective bearing 15 is adjusted to be approximately coaxial with the inner diameter of radial electromagnet 12. The gap between the inner diameter of protective bearing 15 and the opposing rotary shaft is set to be slightly smaller than the gap between the inner diameter of radial electromagnet 12 and the opposing rotary shaft, so as to prevent contact between rotary shaft 2 and each electromagnet member.

Figure 15:
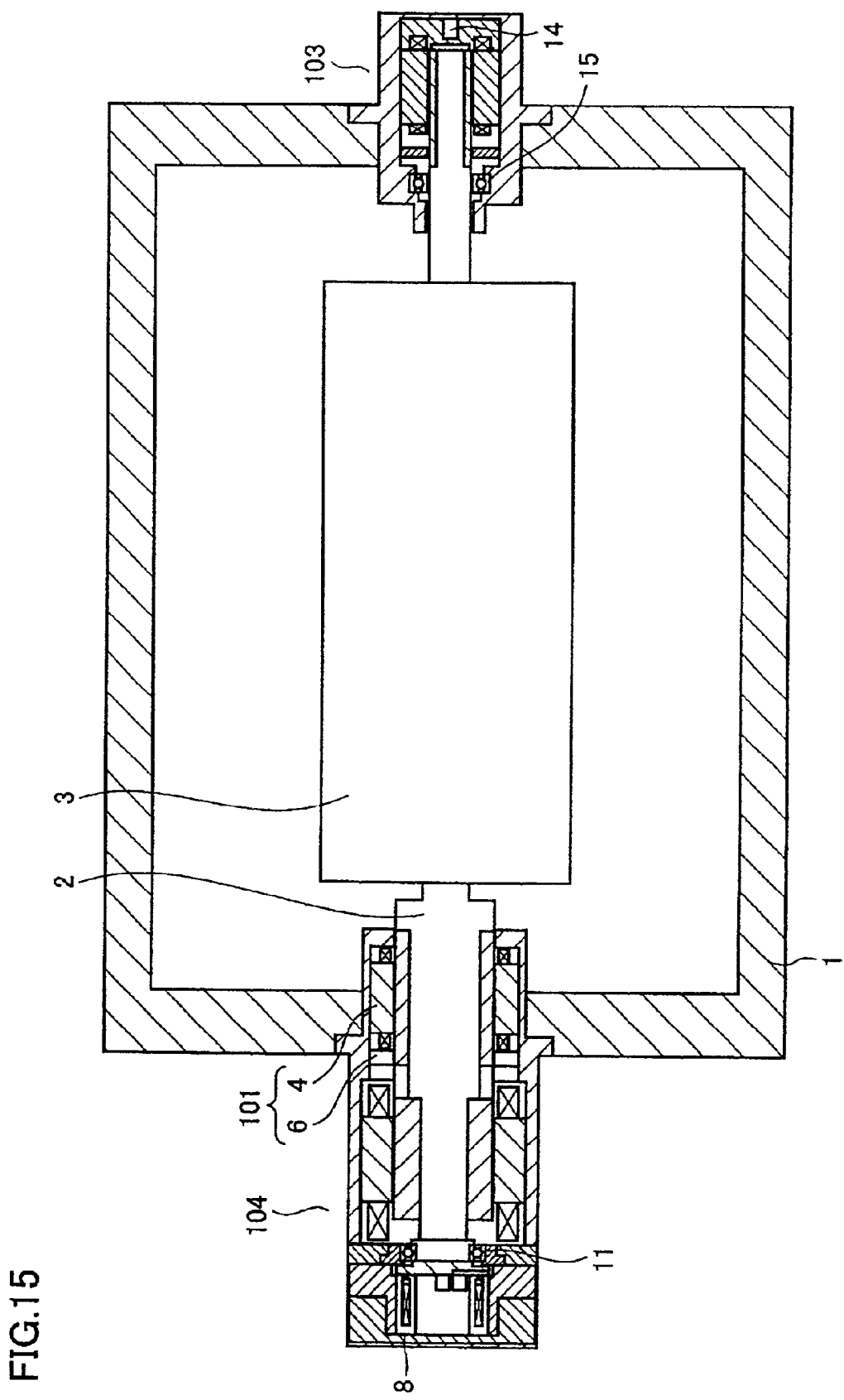
FIG. 15 is a vertical sectional view of a reflux fan for an excimer laser apparatus in accordance with a fourth embodiment of the present invention.

FIG. 15 is a vertical cross section showing a fourth embodiment of the present invention. Referring to FIG. 15, radial magnetic bearing portion 101 is arranged between motor 104 and fan 3, and except this point, the structure is the same as that shown in FIG. 14. The embodiment shown in FIG. 15 is advantageous in that the length of rotary shaft 2 can be made shorter.

In the embodiment shown in FIGS. 14 and 15, protective bearings 11 and 15 are arranged at two portions. If the rotary shaft 2 is long, a third protective bearing 16 may be arranged in between.

Figure 16:
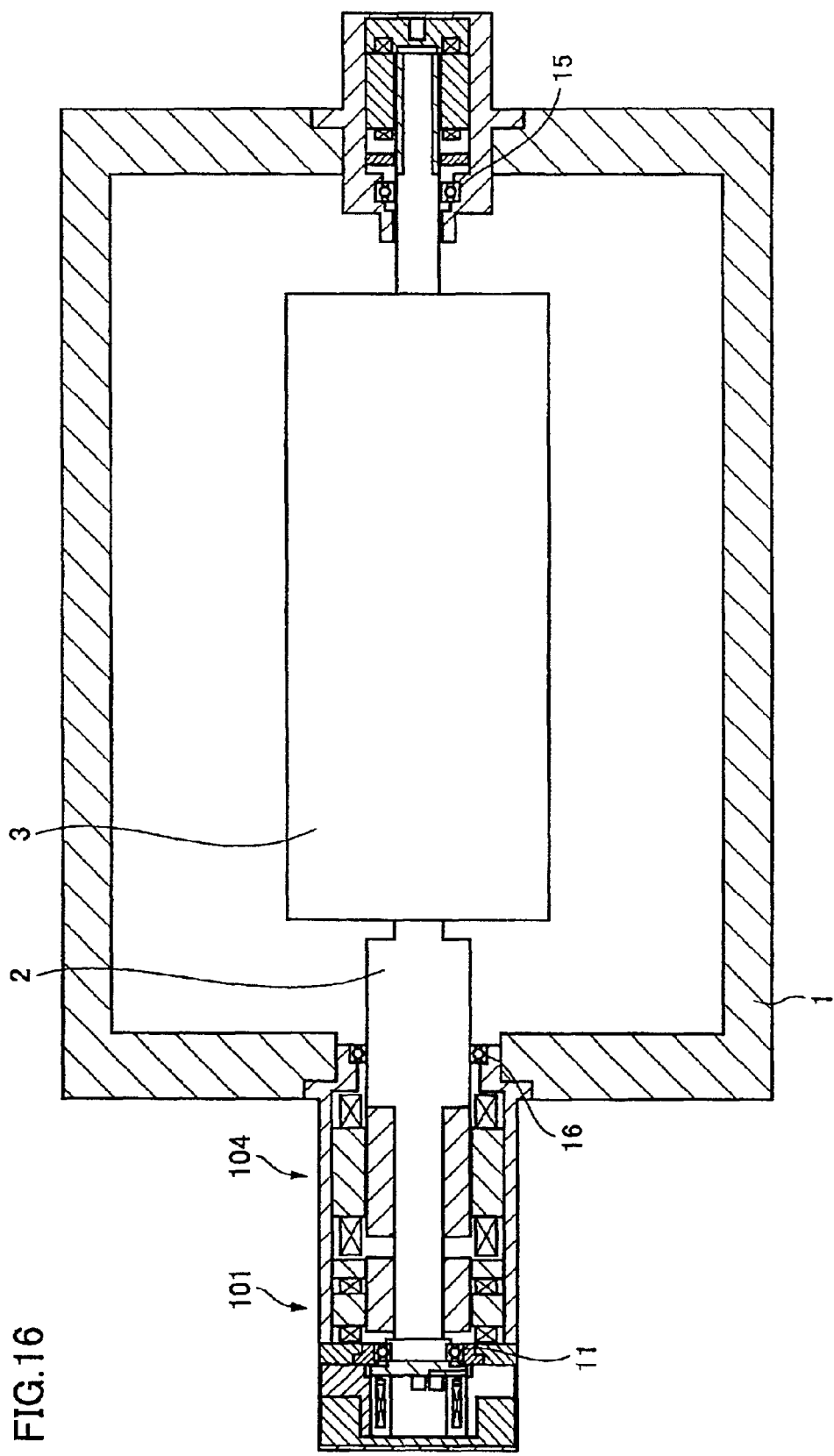
FIG. 16 is a vertical sectional view of a reflux fan for an excimer laser apparatus in accordance with a fifth embodiment of the present invention.

FIG. 16 is a cross section showing a fifth embodiment as such.

In the embodiment shown in FIGS. 14 to 16, each magnetic bearing portion detects position of the rotary shaft by means of a position sensor, output of each position sensor is compared with an instruction value and a resulting signal has its phase compensated by a control circuit, its current amplified by a power amplifier, and a current is caused to flow in the coil of the corresponding electromagnet. The control circuit used for the radial magnetic bearings 101 and 103 is formed of proportional and differential elements, and by additional integral element, a constant position control with small deviation from the instruction value is performed, to support the rotary shaft 2. Compensation for the negative spring element of motor 104 is realized by radial magnetic bearing 101 near motor 104.

For the compensation for the negative spring element of motor 101, the following method is used. More specifically, in the control circuit of radial magnetic bearing 101, in parallel with a main phase compensation circuit consisting of proportional, differential and integral elements, a motor compensation circuit is provided, which circuit consists of a proportional element, and the gain of the proportional element is changed in accordance with the number of rotation of the motor or the motor current. Details will be described in the following.

Figure 17:
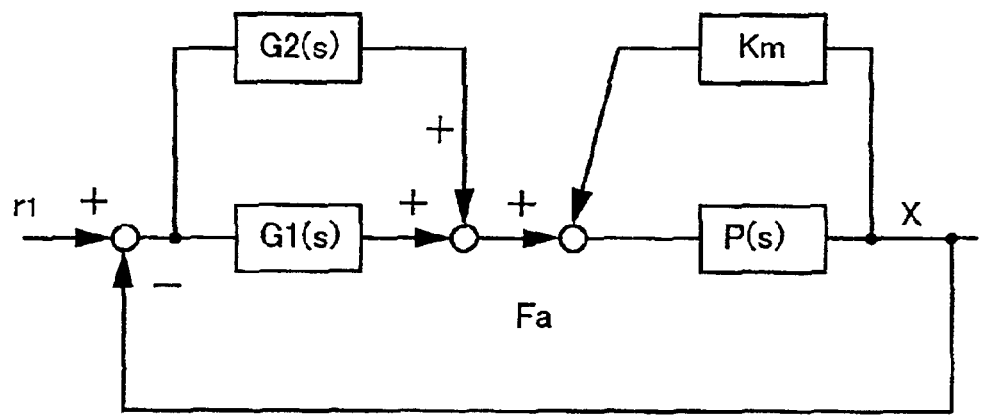
FIG. 17 is a block diagram of a control system of a rotary shaft including a radial magnetic bearing and a motor.

FIG. 17 is a block diagram of the control system for the rotary shaft including a radial magnetic bearing and a motor.

Referring to FIG. 17, the effect of the motor compensation circuit within the control circuit of radial magnetic bearing 101 will be described. For simplicity, sense amplifier is omitted in FIG. 17. In FIG. 17, as in FIG. 4 described above, P(s) represents an object of control of radial magnetic bearing 101 when there is no influence of the motor, G1(s) represents a control circuit of radial magnetic bearing 101, G2(s) represents a motor compensation circuit, Km represents a negative spring constant of the motor, and r1 represents an instruction value of radial magnetic bearing 101.

G1(s) consists of proportional element, integral element and differential element. The object of control P(s) of the magnetic bearing is represented as $1/(Ms^2-K)$. Here, the magnetic bearing also has a negative spring element, and K corresponds to the negative spring constant. Therefore, the object of control in consideration of the influence of the motor and of G2(s), that is, transfer function from Fa to x can be given by the following equation.

$$P1(s)=1/(Ms^2-K-Km+G2(s))$$

Therefore, when it is possible to set the characteristic G2(s) of the motor compensation circuit to be $G2(s) \approx Km$, the influence of the motor on the magnetic bearing control can be eliminated, and stable control is realized.

Here, the influence of the motor, that is, Km changes dependent on the attraction force between motor rotor 17 and motor stator 10. More specifically, spring element Km of motor 104 changes in accordance with the number of rotation of the motor, motor load and motor current. In FIG. 14, a rotation sensor 21 is provided at an end portion of the rotary shaft. The rotation sensor 21 is formed of a magnetic sensor, and by forming a notch 22 on an opposing surface of the rotary shaft, the number of rotation of the rotary shaft can be measured. By changing the transfer function G2(s) of the motor compensation circuit of radial magnetic bearing 101 in accordance with the measured number of rotation, it becomes possible to always perform the optimal control.

Generally, as the number of rotation increases, the negative spring constant Km of motor 104 increases. Therefore, proportional gain of G2(s) should preferably be increased. Further, as the motor current value increases, the negative spring constant of motor 104 increases. By changing the transfer function G2(s) of the motor compensation circuit of radial magnetic bearing 101 in accordance with the monitored current value of motor 104, it is possible to always perform the optimal control. In either case, the transfer function G2(s) may be changed continuously in accordance with the number of rotation or the motor current value, or it may be changed stepwise.

In order to change control in accordance with the number of rotation or the motor current value, it is preferable to use software control, employing, as control means, a CPU or a DSP.

Next, the second method will be described in which two different types of coils are wound as the coils of radial electromagnet 4 of radial magnetic bearing 101, a control circuit for causing current flow in the first coil is formed by proportional, differential and integral elements, a motor compensation circuit is used for the second coil, the circuit is formed by a proportional element, and the gain of the proportional element is changed in accordance with the number of rotation or motor current of motor 104.

Figure 18:
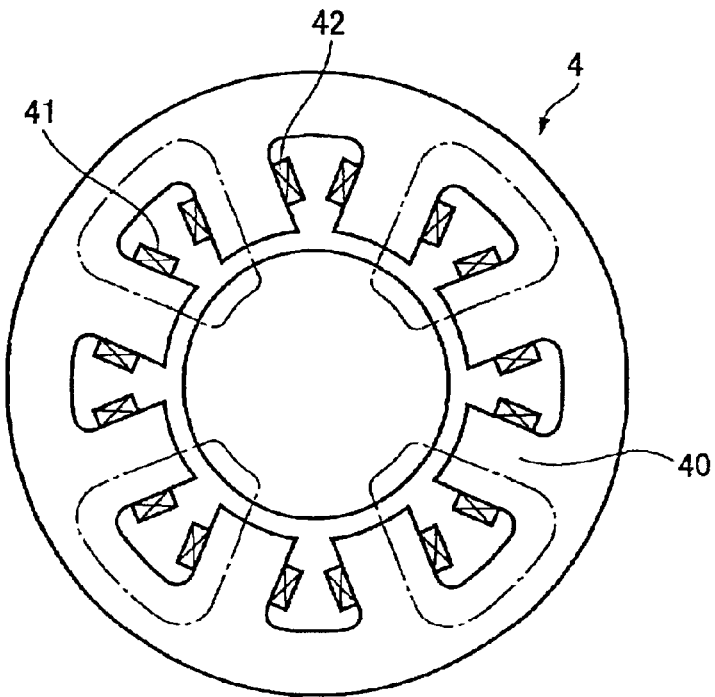
FIG. 18 is a cross sectional view of an electromagnet of the radial magnetic bearing.
Figure 19:
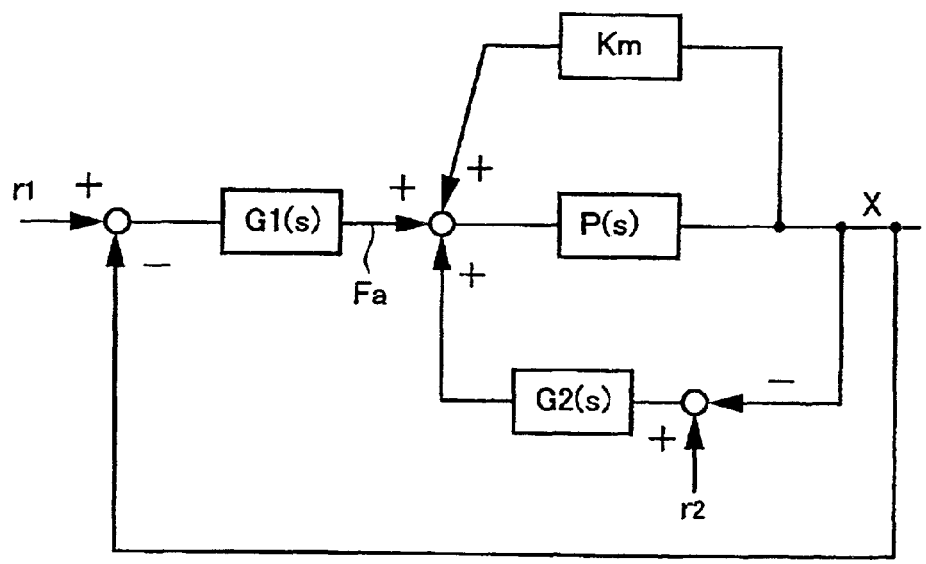
FIG. 19 is a block diagram related to control of the radial magnetic bearing.

FIG. 18 is a cross sectional view of the electromagnet of the radial magnetic bearing, and FIG. 19 is a block diagram of the control circuit. The electromagnet shown in FIG. 8 has 8 magnetic poles 40 in the circumferential direction, and by adjacent two magnetic poles, electromagnetic force is generated on the rotary shaft. In this manner, radial electromagnet 4 includes two sets of magnetic poles 40, and coils 41, 42. By adjusting currents to be flown in the pair of coils 41, 42 by means of different control circuits, the influence of the motor can be corrected. The control circuit driving the first coil 41 of FIG. 18 is represented by G1(s) and the control circuit driving a second coil 42 is represented by G2(s) in FIG. 19. By forming G1(s) with proportional, differential and integral elements, a constant position control with small deviation from an instruction value is performed, and the rotary shaft 2 is supported.

Meanwhile, G2(s) is formed by proportional and differential elements, compensates for the negative spring element of the motor, and improves controllability of radial magnetic bearing 101. For simplicity, sense amplifier is not shown in FIG. 19.

Figure 20:
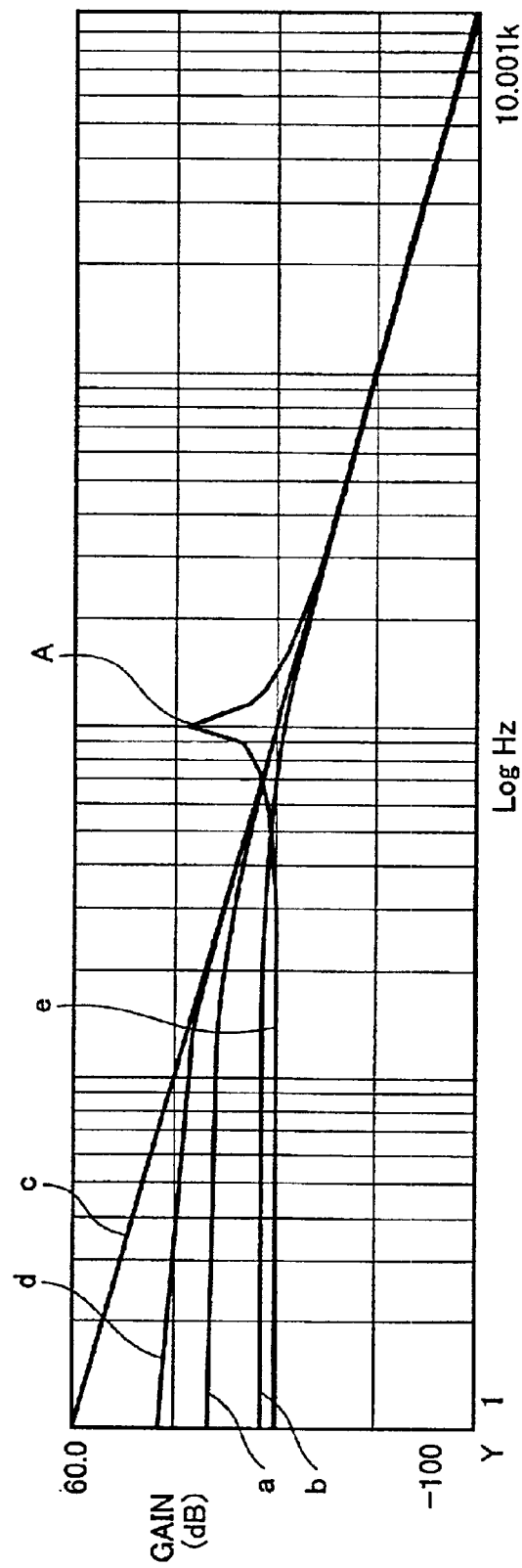
FIG. 20 represents transfer function from Fa to x when G2(s) is formed of proportional element.
Figure 23A:
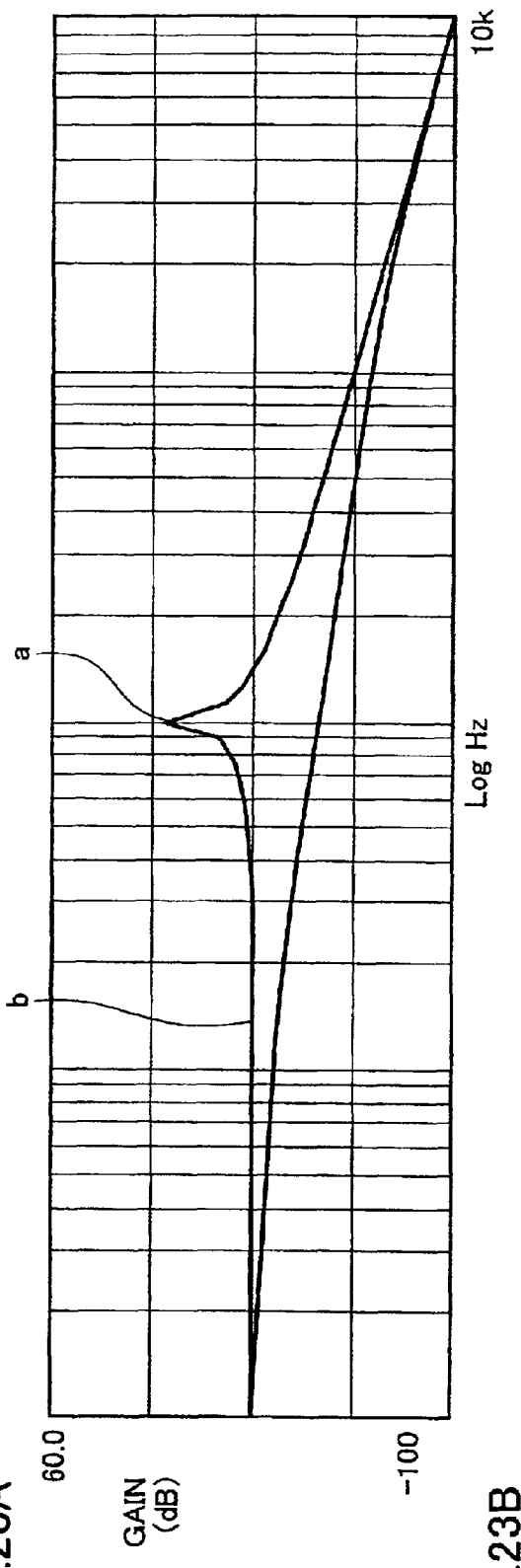
FIGS. 23A and 23B represent transfer function from Fa to x when G2(s) is formed both of proportional and differential elements.
Figure 23B:
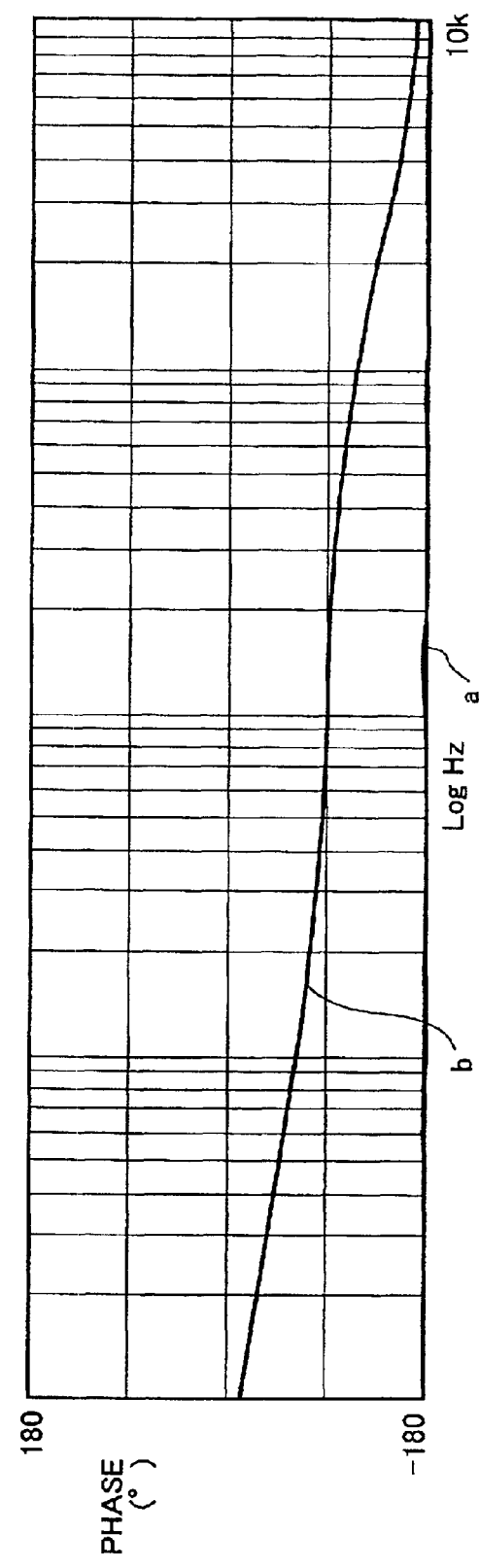

FIGS. 20 and 23A and 23B are Bode diagrams of the object of control of radial magnetic bearing 101. Referring to these figures, the effect of G2(s) will be described. In FIG. 19, P(s) represents the object of control viewed from the first coil 41 not influenced by the motor, G1(s) represents the control circuit of the first coil 41, G2(s) represents the control circuit of the second coil 42, Km represents a negative spring constant by the motor, and r represents an instruction value of radial magnetic bearing 101.

G1(s) consists of proportional, integral and differential elements. The object of control P(s) viewed from the first coil 41 is represented as $1/(Ms^2-K)$. M represents the mass of the object of control, and s represents a Laplacian operator. Here, the magnetic bearing also has a negative spring element, and K corresponds to the negative spring constant. Therefore, the object of control in consideration of the influence of motor 104, that is, transfer function from Fa to x is $P1(s)=1/(Ms^2-K-Km+G2(s))$. Here, the transfer function from Fa to x (only the gain curve) when G2(s) consists of proportional element is shown in FIG. 20.

Referring to FIG. 20, solid line a represents the transfer function $(P1(s)=1/(Ms^2-K))$ when there is no influence of motor (Km=0) and G2(s)=0, solid line b represents the transfer function $(P1(s)=1/(Ms^2-K-Km))$ when there is an influence of motor and G2(s)=0, solid line c represents the transfer function $(P1(s)=1/Ms^2)$ when there is an influence of motor and G2(s)=(K+Km), solid line d represents transfer function $(P1(s)=1/(Ms^2-K-Km+Ky))$ when there is an influence of the motor and G2(s)=Ky, 0<Ky<(K+Km), and solid line e represents transfer function $(P1(s)=1/(Ms^2-K-Km+Ke))$, when there is an influence of the motor and G2(s)=Ke, Ke>(K+Km).

As can be seen from FIG. 20, when transfer function G2(s) of the control circuit for the second coil consists only of the proportional element and the gain of the proportional element is at least 0 and at most (K+Km), it is possible to increase the gain in the low frequency range of the object of control P1(s). When the gain of the proportional element is not smaller than (K+Km), it is possible that a peak (A in FIG. 20) is generated in the object of control P1(s), hindering controllability of the magnetic bearing.

In this manner, by forming G2(s) by only the proportional element and setting the gain of the proportional element to be at least 0 and at most (K+Km), the gain in the low frequency range of the object of control P1(s) can be increased, and as a result, stability of the magnetic bearing can be improved.

FIGS. 21A and 21B represent transfer function from Fa to x when G2(s) is formed only of the differential element. FIG. 21A represents gain characteristic, and FIG. 21B represents phase characteristic. In FIGS. 21A and 21B, solid line a represents transfer function $(P1(s)=1/(Ms^2-K-Km))$ when there is an influence of the motor and G2(s)=0. Solid lines b, c, d and e represent transfer function $(P1(s)=1/Ms^2+cs-K-Km))$ when there is an influence of the motor and G2(s)=cs with the value c increased variously. Here, c is referred to as differential gain.

It can be understood from FIGS. 21A and 21B, that, as the value c increases, the gradient of the gain flat portion in the low frequency range of the object of control P1(s) increases, and the phase also comes to exhibit phase advanced characteristic. More specifically, when G2(s) consists of differential element, the gain curve in the low frequency range shown in FIG. 21A can be improved and, at the same time, the phase advances as shown in FIG. 21B, and therefore, control performance of radial magnetic bearing 101 can significantly be improved.

FIGS. 22A and 22B as well as FIGS. 23A and 23B represent transfer function from Fa to x when G2(s) is formed by proportional and differential elements, and A and B represent the gain characteristic and phase characteristic, respectively.

In FIGS. 22A and 22B, solid line a represents an example not including differential element for comparison, representing transfer function $(P1(s)=1/(Ms^2))$, when there is an influence of the motor and G2(s)=(K+Km). Solid line b represents transfer function $P1(s)=1/(Ms^2+cs)$ when there is an influence of the motor and G2(s)=(cs+K+Km).

By introducing the differential element, the gradient of the gain curve on the low frequency side decreases as shown in FIG. 22A, while the phase in the low frequency range can be advanced as shown in FIG. 22B. More specifically, by forming the control circuit of the radial magnetic bearing with proportional and differential elements, the gain curve of the low frequency range can be improved and, at the same time, the phase is advanced, so that controllability of radial magnetic bearing 101 by the first coil 41 and the control circuit G1(s) can be significantly improved.

In FIGS. 22A and 22B, solid line a represents transfer function (P1(s)=1/(Ms2−K−Km+Ke)) when there is an influence of motor and G2(s)=Ke, Ke>(K+Km), and solid line b represents transfer function (P1(s)=1/(Ms2+cs−K−Km+Ke)) when there is an influence of the motor and G2(s)=cs+Ke, Ke>(K+Km).

In solid line a, the gain curve has a maximum. As the differential element is introduced, the characteristic is improved and, at the same time, the phase can be advanced. More specifically, even under the condition in which G2(s) consist of a proportional constant Ke which is not smaller than the sum of the negative spring constant of the magnetic bearing and the negative spring constant of the motor, the peak appearing on the gain curve can be suppressed by the addition of the differential element and, in addition, the phase advanced characteristic can be obtained. Thus, controllability of radial magnetic bearing 101 can significantly be improved.

Though it has been assumed that the spring element of the motor is constant, actually, it varies dependent on the number of rotation of the motor or the motor current. In FIG. 14, a rotation sensor 21 is provided at an end of the rotary shaft. The rotation sensor 21 is formed of a magnetic sensor, and as a notch 22 is provided on an opposing surface of the rotary shaft, the number of rotation of the rotary shaft can be measured. By varying G2(s) in accordance with the measured number of rotation, it is possible to always perform the optimal control. Generally, as the number of rotation increases, the negative spring constant Km of the motor increases, and therefore, proportional gain of G2(s) should preferably be increased. As the motor value increases, the negative spring constant of the motor increases. By changing G2(s) in accordance with the monitored current value of the motor, it is possible to always perform the optimal control. In either case, the transfer function G2(s) may be changed continuously in accordance with the motor current value or the number of rotation, or it may be changed stepwise.

In order to change control in accordance with the number of rotation or the motor current value, software control utilizing CPU or DSP as control means may be employed.

The embodiment shown in FIGS. 14, 15 and 16 are also configured to enable attachment/detachment of rotary shaft 2 without the necessity of removing housing 200, as in the embodiment of FIGS. 1 and 2.

In the embodiment shown in FIGS. 1 and 2, the rotary shaft 2 is long, and therefore, it is possible that excessive stress such as bending stress is applied when rotary shaft 2 is assembled, rotary shaft 2 may be damaged during assembly, or rotary shaft 2 may hit protective bearing 10, 15 and is deformed, as excessive disturbance exceeding supporting capacity of the magnetic bearing is abruptly applied to rotary shaft 2 while it is rotating. Further, in the process step of manufacturing rotary shaft 2 itself, there may be plastic deformation on the surface layer of the material during cutting or polishing, and hence rotary shaft 2 has various causes of deformation.

When rotary shaft 2 is formed of austenitic stainless steel, induced martensitic transformation occurs due to a slight plastic deformation, resulting in martensite dotted in austenite as the main texture of rotary shaft 2.

As the texture transformation from austenite to martensite causes positive volume change, rotary shaft 2 is bent. When temperature of rotary shaft 2 increases, rotary shaft 2 is further bent because of the difference in thermal expansion between austenite and martensite.

When rotary shaft 2 is bent, vibration of fan 3 increases at the time of rotation, resulting in degraded performance of the excimer laser apparatus used for fine processing. The embodiment below is a solution to such a problem.

Figure 24:
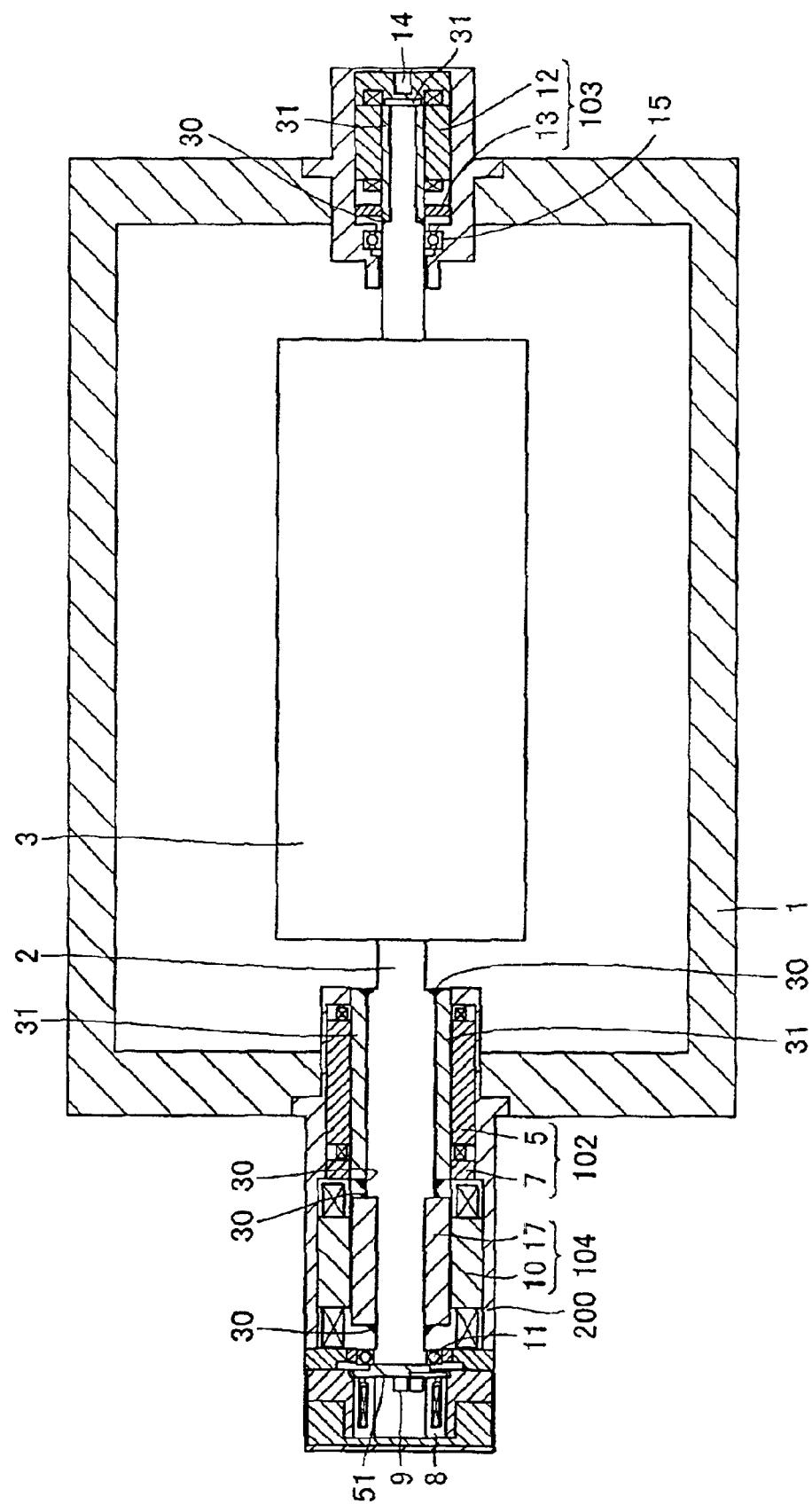
FIG. 24 is a cross sectional view of a fan apparatus for circulating excimer laser gas in accordance with a sixth embodiment of the present invention.

FIG. 24 is a cross sectional view of the reflux fan apparatus for circulating excimer laser gas in accordance with the sixth embodiment of the present invention. Referring to FIG. 24, in the present embodiment, rotary shaft 2 is mainly formed of austenitic stainless SUS304. A magnetic body 31 having high magnetic permeability such as permalloy is arranged at a position opposing to each of the electromagnets 5, 8, 12, and the magnetic body 31 is fixed on the austenitic stainless. As to the method of fixing, welding, brazing or the like may be utilized. In the present embodiment, magnetic body 31 is fixed on the austenitic stainless at a welding portion 30.

A magnetic body 51 opposing to axial electromagnet 8 as the electromagnet of the axial magnetic bearing is not fixed to facilitate by welding assembly of the apparatus. Motor rotor 17 is fixed also by welding, for example.

As magnetic body 31 is fixed on rotary shaft 2, magnetic body 31 acts not as an added mass but as a spring system with respect to rotary shaft 2. Thus, decrease in bending natural frequency of rotary shaft 2 can be suppressed.

As the austenitic stainless is hard to process, it is possible that internal stress remains after processing. Further, it is possible that rotary shaft 2 is bent as the internal stress generated by welding or the like is afterwards released.

Therefore, after processing or welding of rotary shaft 2, annealing is performed to remove stress. Higher annealing temperature is preferred, and annealing should preferably be performed at a temperature of 300° C. or higher. This removes stress and suppresses bending of rotary shaft 2.

Further, in SUS304, austenite texture is not stable, and martensitic transformation is likely. When martensitic transformation occurs, positive volume change results, and rotary shaft 2 is bent.

Therefore, as the austenitic stainless material, a material is used which contains at least 16 Ni equivalent (% Ni+30×% C+0.5×% Mn) which is an index of stability of the austenite texture, and at least 18 Cr equivalent (% Cr+% Mo+1.5×% Si+0.5×% Nb) as an index of stability of ferrite texture.

Figure 25:
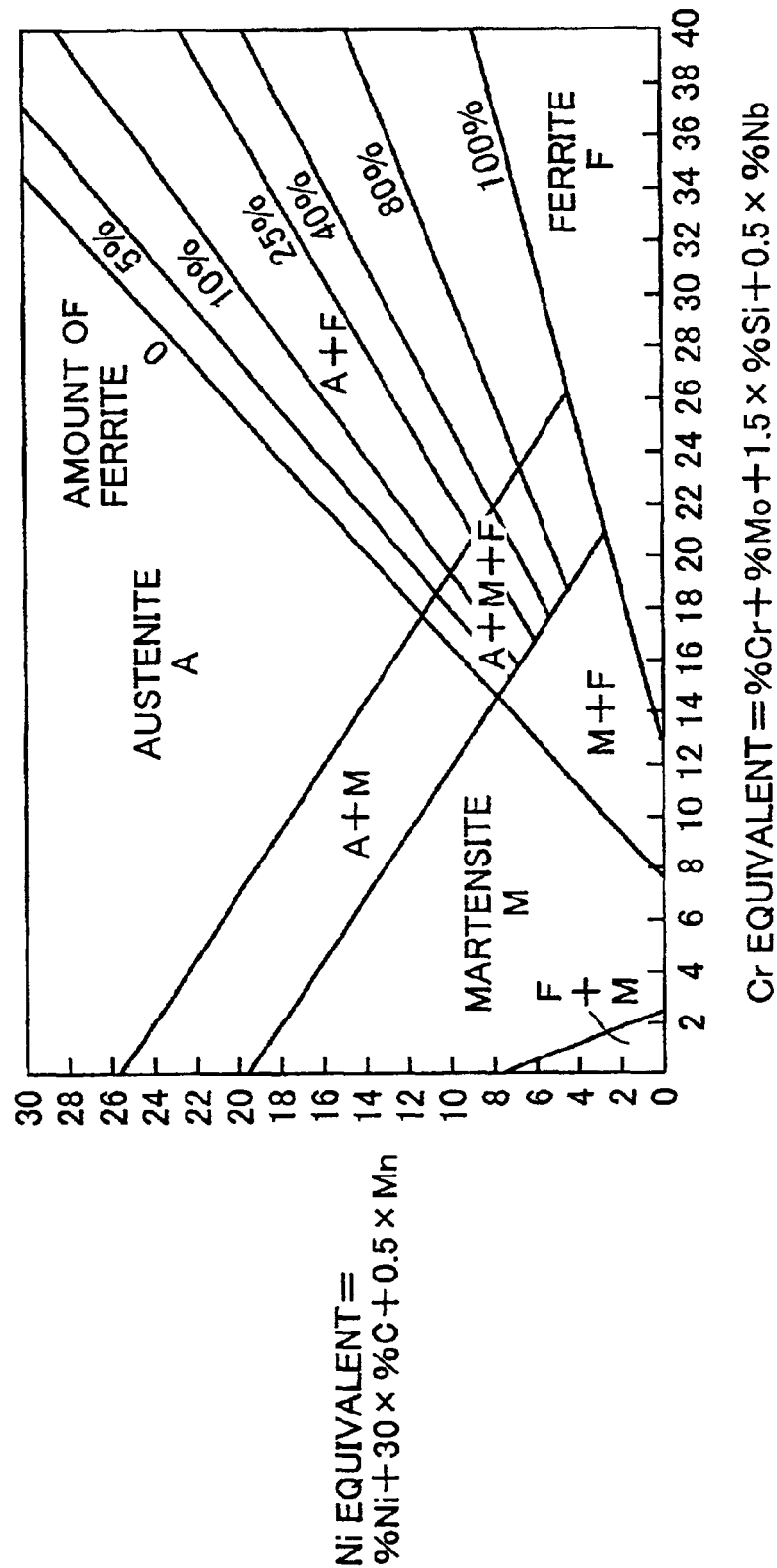
FIG. 25 is a texture diagram (Schaeffler diagram) of stainless steel.

FIG. 25 shows the texture (Schaeffler diagram) of the stainless steel. By selecting the material as described above, bending of rotary shaft 2 can be suppressed, as there is no martensite texture inside.

It is also important in order to suppress bending of rotary shaft 2, that induced martensitic transformation hardly occurs.

Therefore, it is possible to introduce the idea of necessary Ni amount to prevent martensite during room temperature processing and to regulate components, in accordance with C. B. Post, published in TASM in 1947.

More specifically, it is possible to suppress bending of rotary shaft 2 caused by induced martensitic transformation, when necessary Ni component amount (% Ni) is calculated in the manner as described below based on the component amounts of the material, and a material having Ni amount larger than the calculated % Ni is used.

% Ni=(% Cr+1.5×% Mo−20)2/12−(% Mn/2)−35×% C+15

Figure 26:
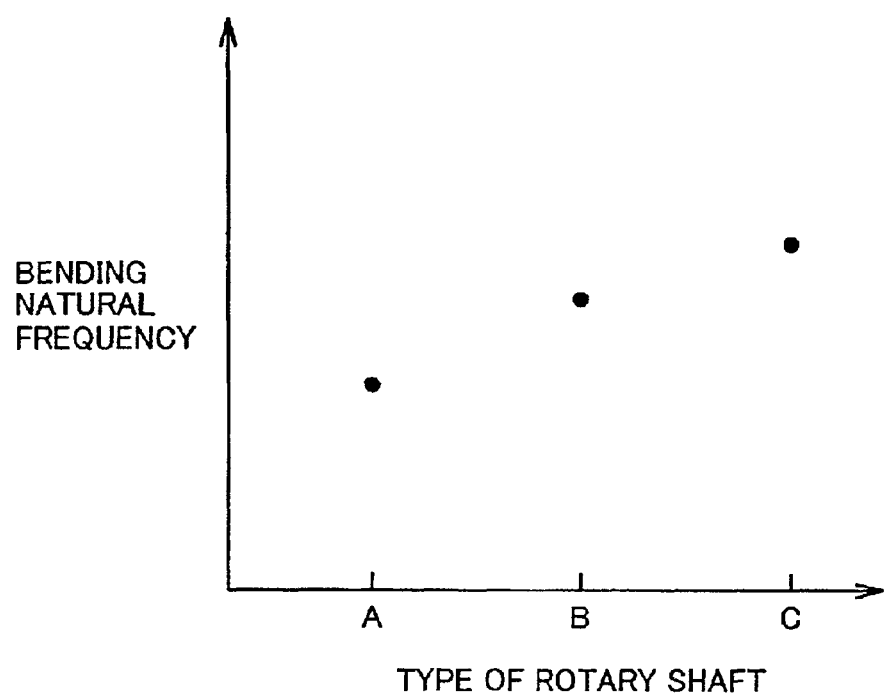
FIG. 26 represents variation in bending natural frequency dependent on the type of rotary shaft.

In this manner, when austenitic stainless having high elastic coefficient is used as the material of the rotary shaft and a magnetic body is fixed selectively only at a position opposing to the electromagnet, the magnetic body portion acts on the rotary shaft not as an additional mass but as a spring system. Thus, as can be seen from FIG. 26, decrease in bending natural frequency of the rotary shaft can be suppressed.

In the embodiment shown in FIGS. 1, 2, 14 and 15, countermeasures against the damages to the magnetic bearing or motor caused by corrosive laser gas in the chamber 1 are not considered. As described in U.S. Pat. No. 5,848,089, it is possible to protect against the corrosive laser gas, by covering the rotary shaft 2 with a can. It is difficult, however, to disassemble such a structure for maintenance, and processing precision of the can must be very high. Further, air gap of the magnetic bearing increases by the thickness of the can.

Now, an embodiment of the structure of the reflux fan for an excimer laser apparatus which does not use a can while the magnetic bearings, position sensors and the like are not directly exposed to the fluorine gas atmosphere, will be described.

Figure 27:
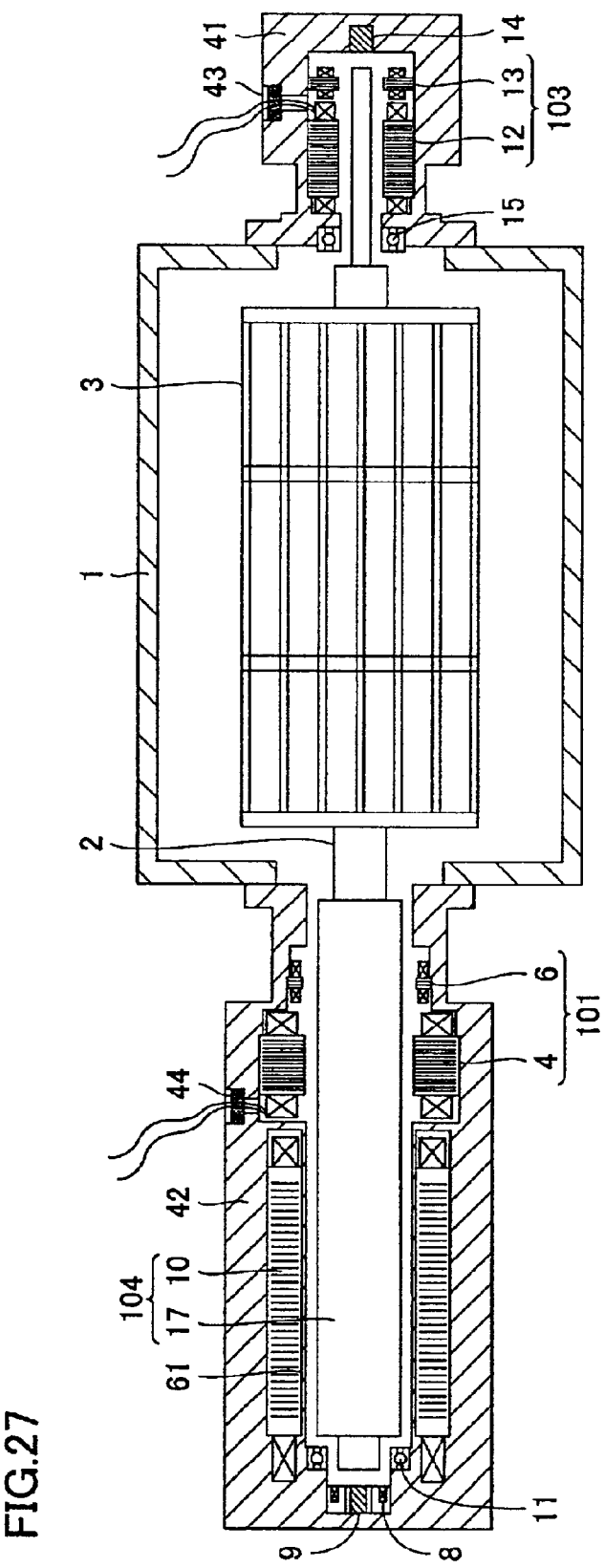
FIG. 27 is a vertical sectional view of a seventh embodiment of the present invention.

FIG. 27 is a cross section of the gas circulation fan of the excimer laser in accordance with the seventh embodiment of the present invention. FIG. 27 shows a fan 3 circulating excimer gas and the periphery thereof. The laser gas is sealed in chamber 1, and fan 3 attached on rotary shaft 2 rotates in chamber 1. On the right side of chamber 1, a housing 41 is provided and, on the left side, a housing 42 is provided. Magnetic bearings supporting rotary shaft 2 are provided on opposing sides of chamber 1. In FIG. 1, on the right side, a first radial electromagnet 12 and a first position sensor 13 are provided in housing 41, and electrowires for radial electromagnet 12 and position detection sensor 13 are drawn out from a cable outlet 43. At a portion of housing 41 opposing to one side surface of rotary shaft 2, a permanent magnet 14 as a part of an axial magnetic bearing is provided.

On the left side housing 42, radial electromagnet 4, a second position detection sensor 6 and motor stator 10 are provided. Wires for radial electromagnet 4 and position detection sensor 6 are externally drawn out from a cable outlet 44. Motor stator 10 is sealed by a sealing member 61 of stainless steel plate, so as to prevent exposure to and corrosion by the fluorine gas. Further, at a portion of housing 42 opposing to the other end surface of rotary shaft 2, an axial electromagnet 8 and a position detection sensor 9 as parts of axial magnetic bearing are provided. Further, protective bearings 11 and 15 which are ball bearings, are provided in housings 41 and 42.

Figure 28A:
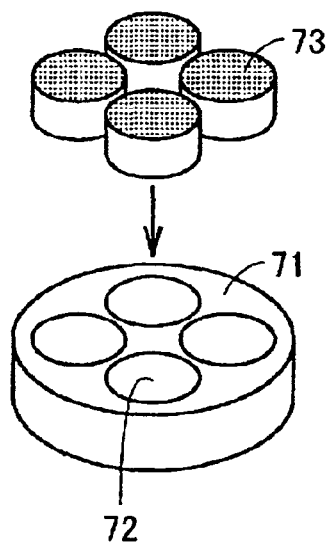
FIGS. 28A to 28F represent steps of manufacturing the radial electromagnet shown in FIG. 27 successively.
Figure 28B:
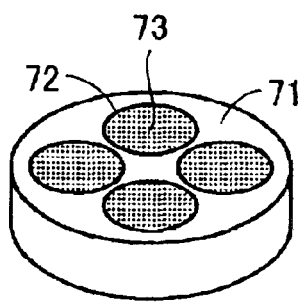
Figure 28C:
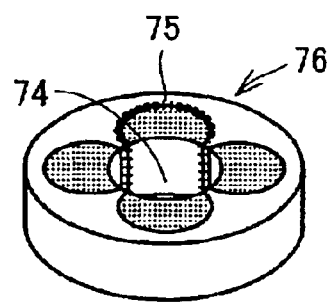

FIGS. 28A to 28F represent the radial electromagnet shown in FIG. 27. As can be seen from FIG. 28A, four through holes 72 are formed in a stainless disk 71 which is relatively thick, and a disk shaped permalloy 73 having the same thickness as disk 7 is inserted to each through hole 72 as shown in FIG. 28B. Then, a central hole 74 through which rotary shaft 2 is passed is formed at the center as shown in FIG. 28C. The contact portion between stainless disk 71 and permalloy 73 is seal-welded 75. A disk shaped member 76 forms a magnetic pole of the electromagnet of radial magnetic bearing 12, and two such members are prepared.

Figure 28D:
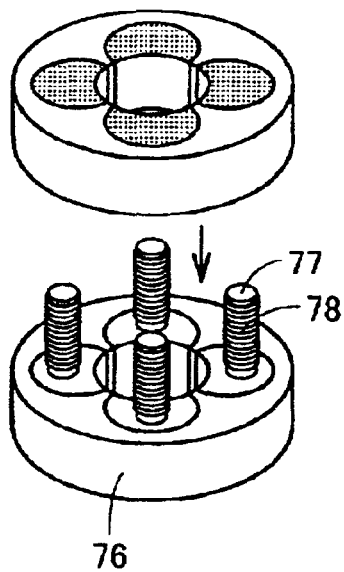
Figure 28E:
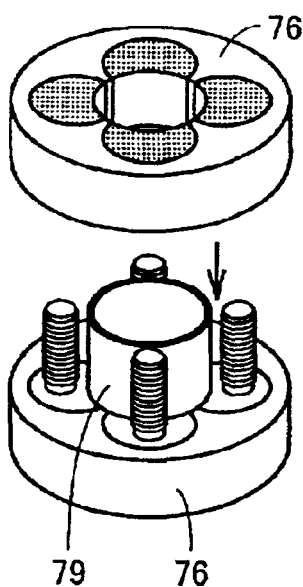

On one disk shaped member 76, four coils 78 wound around pillar shaped permalloy 77 are arranged as shown in FIG. 28D, a cylindrical seal member 79 is arranged to surround central hole 74, and on coils 78 and seal member 79, the other disk shaped member 76 is arranged. The contact surface between seal member 79 and disk shaped members 76, 76 are welded, and an electromagnet for radial magnetic bearing 12 is formed, as shown in FIG. 28F.

Two such radial electromagnets are prepared, which are attached such that outer peripheral surface is in tight contact with an inner peripheral surface of housings 41, 42 shown in FIG. 1, respectively, and contact portion between the inner surface of the housing and disk shaped members 76, 76 is welded so as to prevent entrance of fluorine gas to the tight contact surface.

Figure 28F:
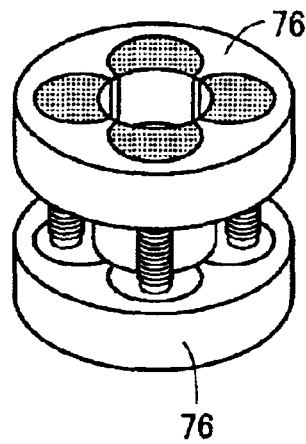
Figure 29:
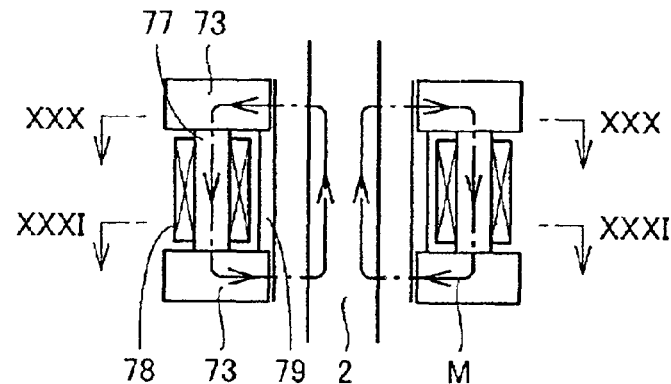
FIG. 29 is a vertical sectional view of the radial electromagnet shown in FIG. 28F.
Figure 30:
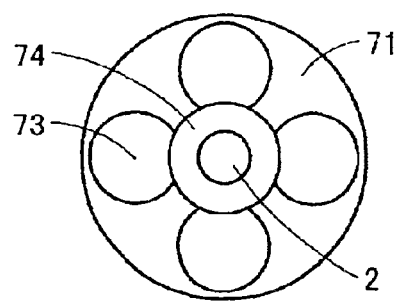
FIG. 30 is a cross sectional view taken along the line XXX—XXX of FIG. 29.
Figure 31:
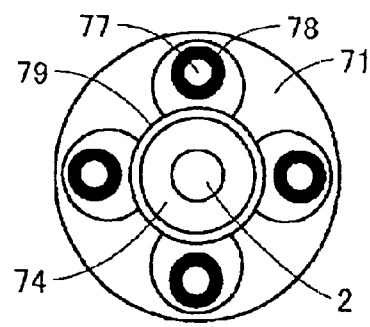
FIG. 31 is a cross sectional view taken along the line XXXI—XXXI of FIG. 29.

FIG. 29 is a vertical cross section of the radial electromagnet shown in FIG. 28F, FIG. 30 is a cross section taken along the line XXX—XXX of FIG. 29, and FIG. 31 is a cross section taken along the line XXXI—XXXI of FIG. 29.

In the radial electromagnet, magnetic flux M from coil 78 flows from one of the upper and lower permalloys 73 through rotary shaft 2 to the other permalloy 73, so that rotary shaft 2 is attracted. Though rotary shaft 2 is exposed to the fluorine gas atmosphere, coils 78 are sealed by sealing member 79, and therefore corrosion by the fluorine gas can be avoided.

The cylindrical seal member 79 seals only the portion of the coils 78 as shown in FIG. 31, and inner peripheral surface of through hole 74 of the disk shaped member 71 serving as the magnetic pole is not sealed as shown in FIG. 30 but exposed to the fluorine gas atmosphere. As the magnetic pole and rotary shaft 2 directly oppose to each other, good flow of magnetic flux is attained.

Figure 32A:
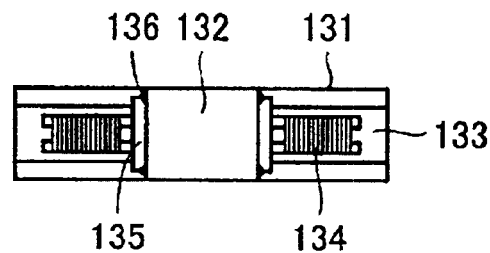
FIGS. 32A and 32B represent radial position detection sensor.
Figure 32B:
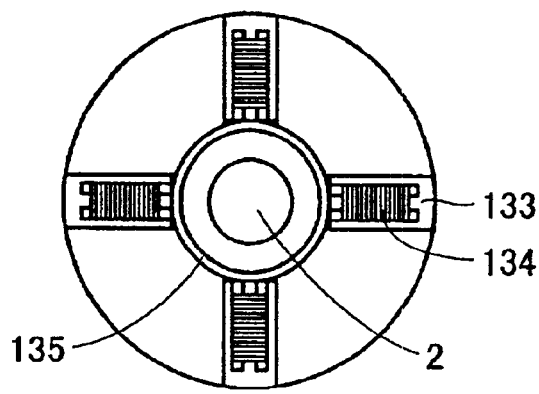

FIGS. 32A and 32B represent a radial position detection sensor, in which FIG. 32A is a vertical sectional view and FIG. 32B is a cross sectional view. As can be seen from FIG. 32A, a relatively thick disk shaped member 131 forms radial position sensor 13, a through hole 132 through which rotary shaft 2 is passed is formed at the center, and four holes 133 are formed from the outer peripheral surface to the through hole 132. In each hole 133, a sensor unit 134 is inserted. In through hole 132, a cylindrical diaphragm 135 is inserted, and a contact portion between diaphragm 135 and disk shaped member 131 is welded 136. Because of the diaphragm 135, sensor unit 134 is not exposed to the fluorine gas atmosphere.

Figure 33A:
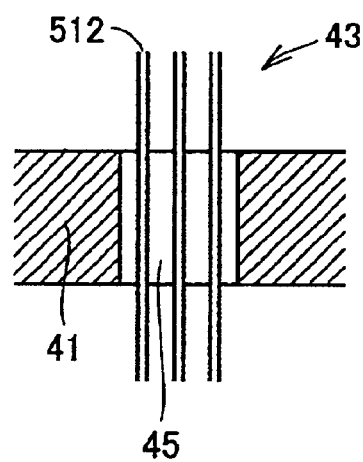
FIGS. 33A and 33B represent, in enlargement, an electric wire outlet of FIG. 29.
Figure 33B:
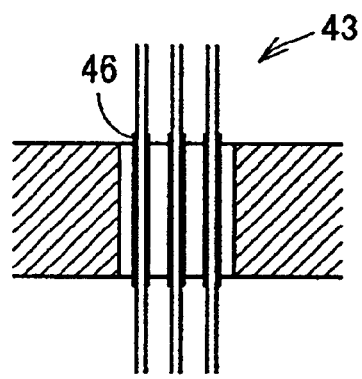

FIG. 33A is a cross sectional view showing, in enlargement, the cable outlet of FIG. 27. The cable outlet 43 of radial electromagnet 12 and position detection sensor 13 of FIG. 27 has ceramic member 45 providing sealing between housing 41 and metal coated electric wire 512 as shown in FIG. 33A, or Kovar 46 sealing the circumference of metal coated electric wire 12, as shown in FIG. 33B. Conventionally, an electric wire is drawn externally by means of a connector and when tight seal between connector and housing fails, it is possible that the fluorine gas leaks to the atmosphere. In the embodiment shown in FIGS. 33A and 33B, there is no possibility of leakage of the fluorine gas to the atmosphere.

Figure 34A:
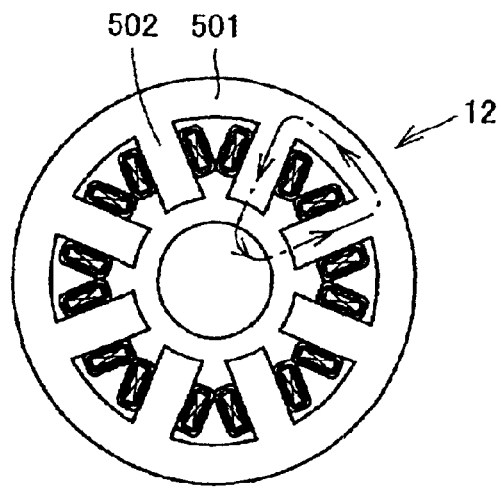
FIGS. 34A to 34C represent another example of a radial magnetic bearing.
Figure 34B:
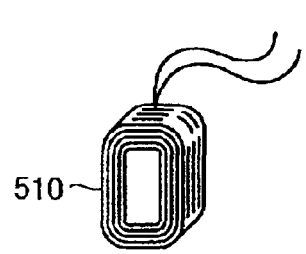
Figure 34C:
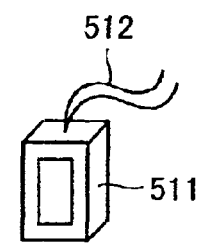

FIGS. 34A to 34C are a cross sectional view of the radial electromagnet 12 in accordance with another embodiment of the present invention. A plurality of projections 502 are formed extending from an inner peripheral surface of a cylindrical magnetic body 501 formed of permalloy to the center. A coil 510 is covered by a coil cover 511 of a magnetic body. A metal coated electric wire 512 having a conductor coated with austenitic stainless or an SUS coating such as Inconel having corrosion resistance against fluorine gas is used at the wire outlet portion of coil 510 extending from coil cover 511. Coil 510 covered with coil cover 511 is inserted to each projection 502 of magnetic body 501, thus forming a radial electromagnet. As the coil 510 is covered by coil cover 511, exposure of coil 510 to fluorine gas atmosphere is prevented.

Figure 35:
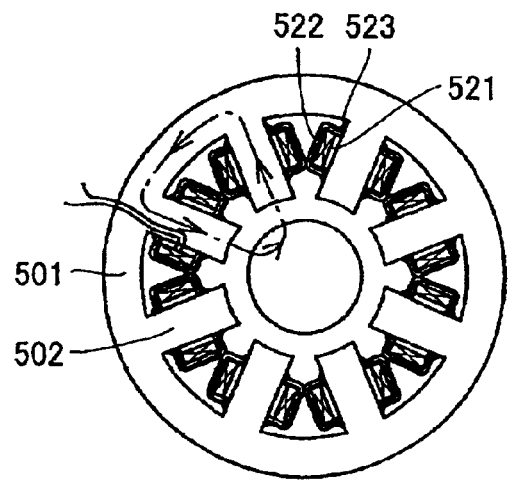
FIG. 35 represents a still further example of a radial magnetic bearing.

FIG. 35 shows another example of the radial electromagnet. In FIG. 35, a coil 521 is wound around projection 502 of magnetic body 501, each coil 521 is covered with coil cover 522, and contact portion between coil cover 522 and projection 502 is welded 523, so that exposure of coil 521 to the fluorine gas atmosphere is prevented.

Figure 36A:
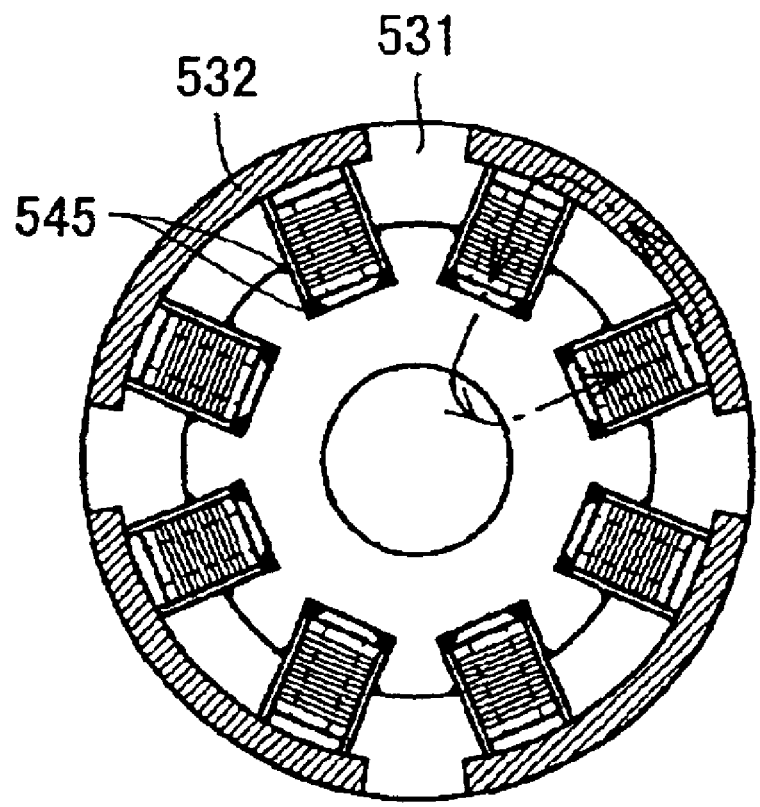
FIGS. 36A and 36B represent a still further example of a radial magnetic bearing.
Figure 36B:
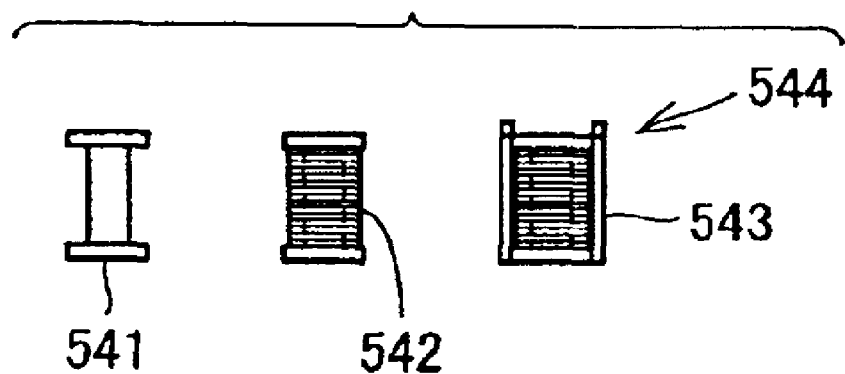

FIGS. 36A and 36B show a further example of the radial electromagnet. Referring to FIGS. 36A and 36B, an arcuate magnetic material is arranged along an outer circumference of a ring shaped non-magnetic material 531. A coil 542 is wound around an electromagnet core 541, and a metal pipe 543 is inserted to surround coil portion 542. Eight such coil members 544 are prepared and welded 545 to the non-magnetic material 531 at every prescribed angle. In this embodiment also, coil 542 is covered by metal pipe 543, and therefore, exposure of coil 542 to the fluorine gas atmosphere can be prevented.

Figure 37:
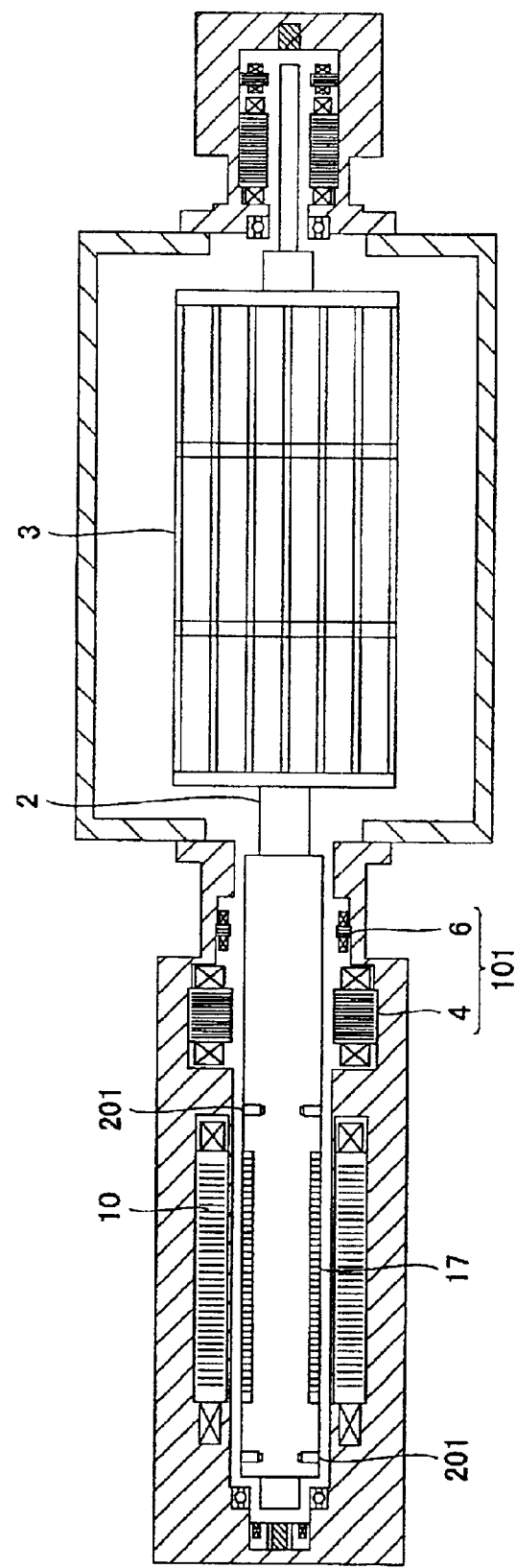
FIG. 37 is a cross sectional view representing an example in which a balance modifying portion is provided on the rotary shaft.

FIG. 37 is a cross sectional view in which a balance modifying portion is provided on the rotary shaft. Referring to FIG. 37, on rotary shaft 2, motor rotor 17 is provided opposing to motor stator 11. Because of the attracting force of motor stator 11 to motor rotor 17, rotary shaft 2 goes out of the center, resulting in poor balance. Thus, in the embodiment shown in FIG. 37, screw holes 201 are provided along the circumferential direction to the central axis of rotary shaft 2, on opposing sides of motor rotor 17. This provides satisfactory balance of rotary shaft 2.

Figure 38A:
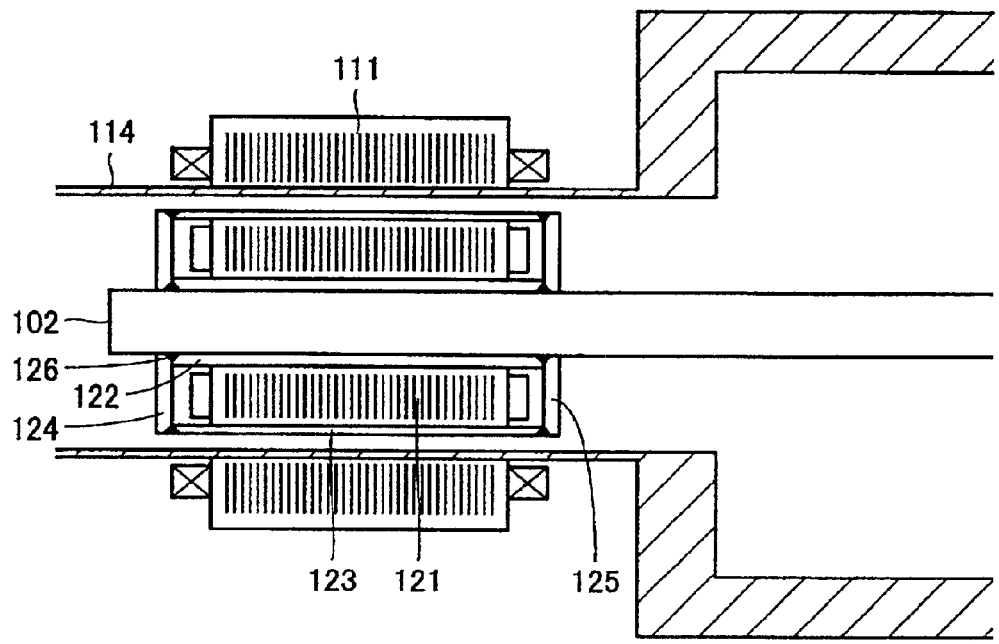
FIGS. 38A and 38B are cross sectional views showing, in comparison, prior art example and an embodiment of the present invention of a motor attaching portion.
Figure 38B:
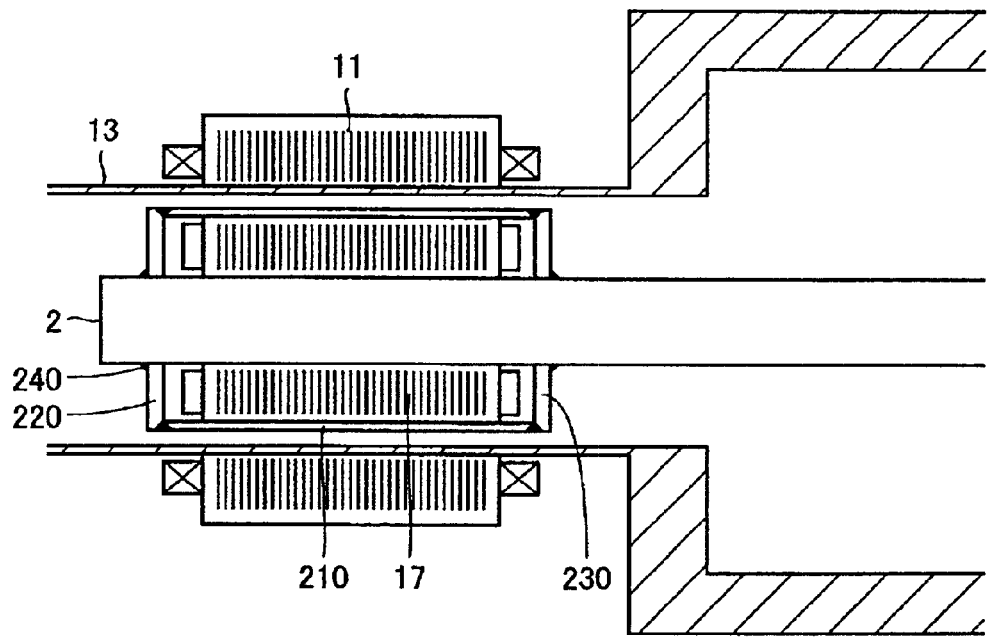

FIGS. 38A and 38B show the motor rotor attachment portion of the prior art and of the seventh embodiment, in comparison with each other.

In the conventional example shown in FIG. 38A, a pipe 114 is provided in the housing so that motor stator 111 is not exposed to the fluorine gas atmosphere and, in addition, motor rotor 121 is also prevented from being exposed to the fluorine gas atmosphere. More specifically, motor rotor 121 is inserted between inner pipe 122 and outer pipe 123, and openings of pipes 122 and 123 are covered by flanges 124, 125 with the junction portion between pipes 122 and 123 with flanges 124 and 125 being welded 126. Rotary shaft 102 is inserted through motor rotor 121 sealed by pipes 122, 123 and flanges 124, 125.

By contrast, in the embodiment of the present invention, referring to FIG. 38B, rotary shaft 2 is inserted through a cylindrical motor rotor 17, opposing ends of pipe 210 are welded with flanges 220 and 230, and junction portion between flanges 220, 230 and rotary shaft 2 are welded 240. Thus, the inner pipe 122 shown in FIG. 38A can be eliminated.

Figure 39A:
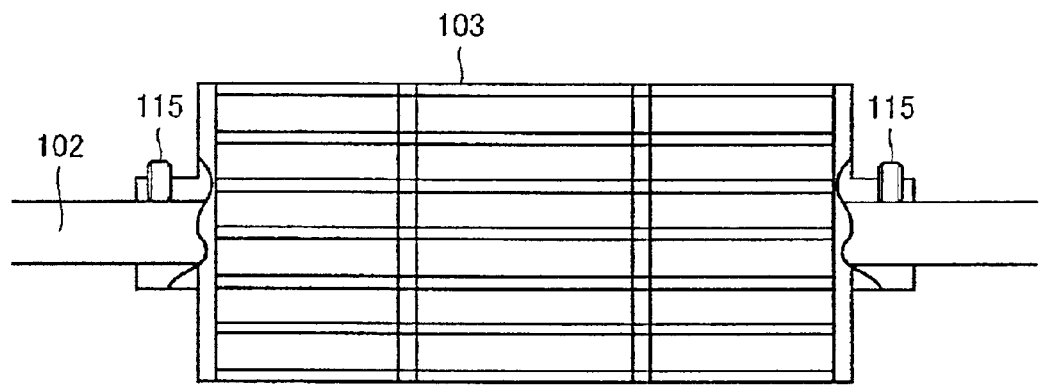
FIGS. 39A to 39C represent, in comparison, a prior art example and an embodiment of the present invention of a method of attaching a fan on the rotary shaft.
Figure 39B:
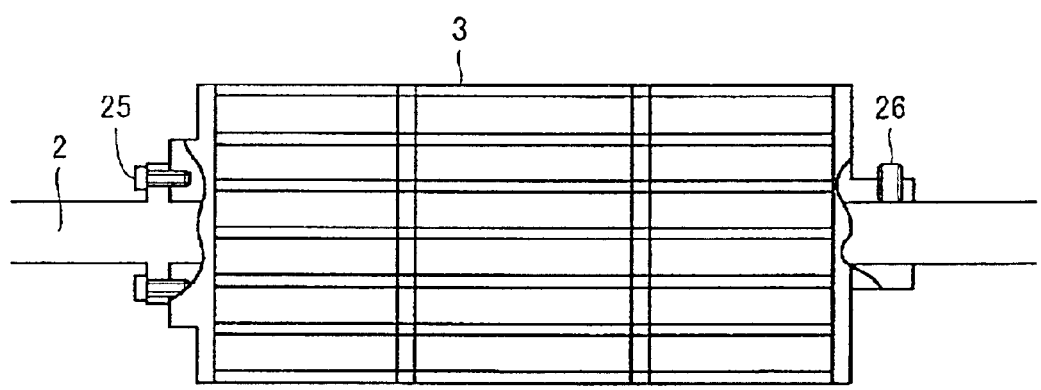
Figure 39C:
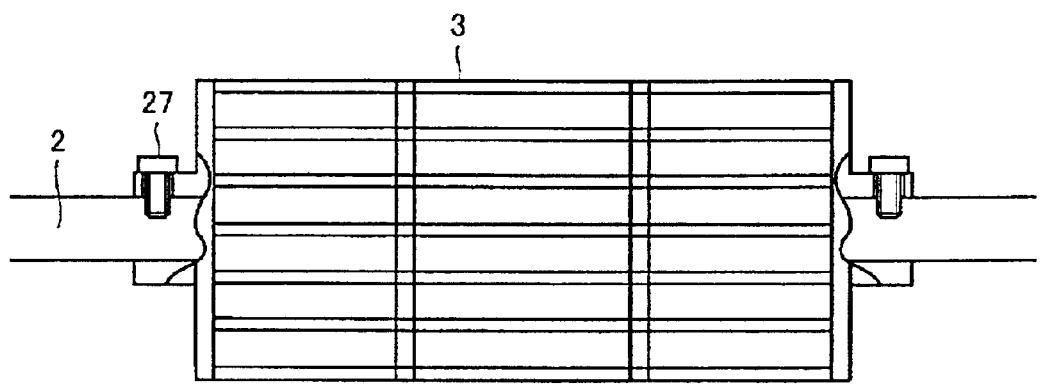

FIGS. 39A to 39C represent a method of attaching the fan on the rotary shaft. FIG. 39A shows a prior art example, in which fan 103 is pressed by means of a screw 115 to rotary shaft 102, so that fan 103 is fixed on rotary shaft 102. Here, it has been possible that the screw 115 comes loose, because of vibration during rotation, for example.

By contrast, in the embodiment shown in FIG. 39B, a flange is formed on one side of fan 3 and, in addition, a flange is formed on rotary shaft 2, and flanges are screwed in the axial direction by means of screws 25. The other side is pressed by means of a screw 26, as in the prior art.

In FIG. 39C, flange portions are formed on one and the other side of fan 3, and these portions are screwed by means of screws 27 on rotary shaft 2, in the direction toward the center of the shaft.

Figure 40:
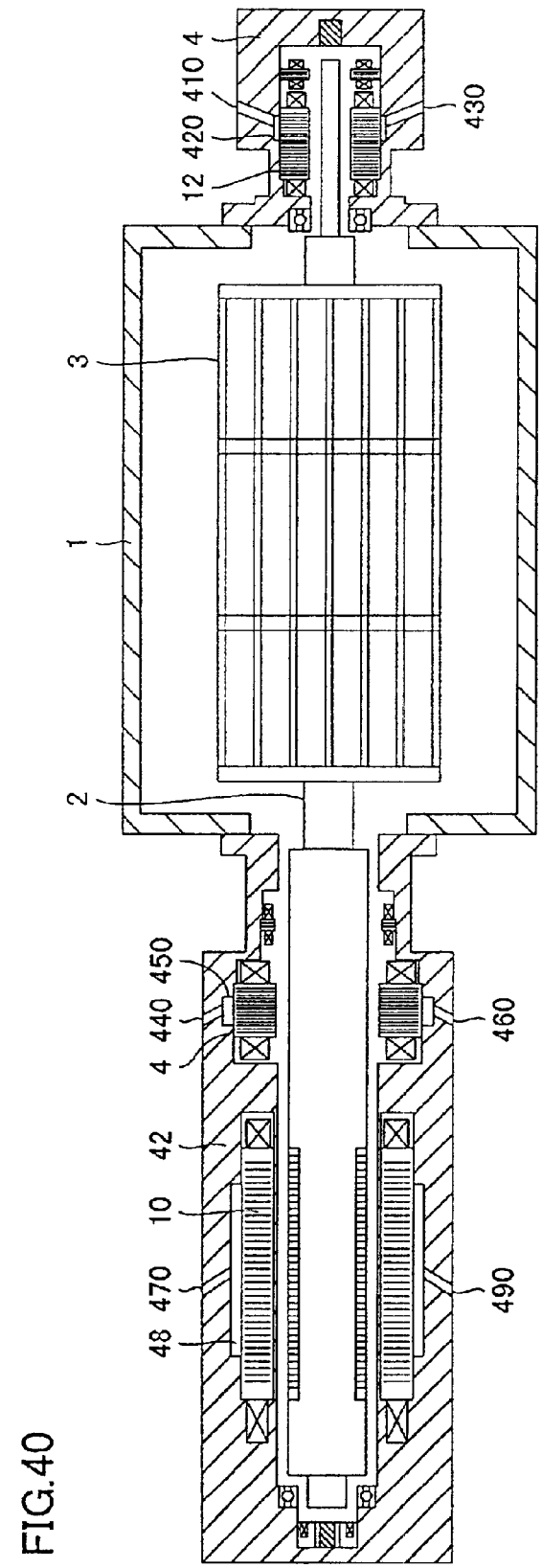
FIG. 40 is a cross sectional view representing an example in which a cooling water path for cooling a radial electromagnet and a motor is provided.

FIG. 40 shows an example in which the radial electromagnet and a motor stator are cooled. Referring to FIG. 40, in housing 41, a cooling water inlet 410, a cooling water path 420 and a cooling water outlet 430 are formed to cool radial electromagnet 12. In housing 42, a cooling water inlet 440, a cooling water path 450 and a cooling water outlet 460 are formed to cool radial electromagnet 4. Further, in housing 42, a cooling water inlet 470, a cooling water path 480 and a cooling water outlet 490 are formed to cool motor stator 10. Much heat is build up by motor stator 10 as compared with radial electromagnets 4, 12. Therefore, it is more efficient to cool motor stator 10 by the water that has cooled radial electromagnets 4, 12. Therefore, it is preferred that by means of a cooling water pipe or the like, not shown, the cooling water outlet 430 of housing 41 is connected to cooling water inlet 440 of housing 42, and cooling water outlet 460 is connected to cooling water 470.

As described above, according to the embodiments of the present invention, the radial electromagnet is formed with its coil sealed by a metal having corrosion resistance against laser gas, and a position detection sensor is arranged around each radial electromagnet with its coil sealed by a metal having corrosion resistance against the laser gas. Therefore, the radial magnetic bearing and position detection sensor are not exposed to the laser gas. Therefore, different from the prior art, it is unnecessary to provide a pipe or the like between the rotary shaft and the radial electromagnet or the position detection sensor, and hence air gap can be made shorter, and in addition, disassembly for maintenance is facilitated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A structure of a reflux fan for an excimer laser apparatus, for circulating laser gas in a chamber by rotation of a fan driven by a motor, comprising:
    a rotary shaft on which the fan is attached and rotated by a driving force of said motor;
    a control type magnetic bearing supporting said rotary shaft in a non-contact manner; and
    a protective bearing supporting the rotary shaft when said control type magnetic bearing is unable to support said rotary shaft; wherein
    said control type magnetic bearing includes
    radial magnetic bearings including radial electromagnets arranged at three portions along axial direction and position detection sensors arranged around respective radial electromagnets, and
    an axial magnetic bearing including one axial electromagnet and at least one permanent magnet;
    said axial electromagnet is arranged opposing to one end surface of said rotary shaft, and said permanent magnet is arranged opposing to the other end surface of said rotary shaft; and
    among said radial magnetic bearings, a first radial magnetic bearing is arranged close to said axial electromagnet, a second radial magnetic bearing is arranged nearer to one side of the rotary shaft than the permanent magnet arranged opposing to an end surface of said rotary shaft, and a third radial magnetic bearing is arranged between said motor and said fan.

2. The structure of a reflux fan for an excimer laser apparatus according to claim 1, wherein said protective bearing includes
a first protective bearing supporting both axial and radial directions of said rotary shaft, and arranged close to said axial electromagnet and said motor, and
a second protective bearing supporting only the radial direction of said rotary shaft, and arranged close to said radial electromagnet of the second radial magnetic bearing.

3. The structure of a reflux fan for an excimer laser apparatus according to claim 2, further comprising
a third protective bearing arranged between said third radial magnetic bearing and said fan, and capable of supporting only the radial direction.

4. The structure of a reflux fan for an excimer laser apparatus according to claim 1, wherein
a soft magnetic material is provided at a portion of said rotary shaft that opposes to said axial electromagnet,
except for said soft magnetic material, said rotary shaft has its diameter made equal to or smaller than each inner diameter of said first radial magnetic bearing, said second magnetic bearing and said third magnetic bearing, from the side of said axial electromagnet to said permanent magnet.

5. The structure of a reflux fan for an excimer laser apparatus according to claim 1, wherein
said radial electromagnets have 8 magnetic poles in a circumferential direction, two adjacent magnetic poles of said 8 magnetic poles generate electromagnetic force on the rotary shaft, or said radial electromagnets have four electromagnets in the circumferential direction and corresponding four magnetic poles in the axial direction and a set of two magnetic poles adjacent in the axial direction exerts electromagnetic force on said rotary shaft, each radial magnetic bearing has two control axes, with each control axis supporting self weight of said rotary shaft.

6. A structure of a reflux fan for an excimer laser apparatus, for circulating laser gas in a chamber by rotation of a fan driven by a motor, comprising:
a rotary shaft on which the fan is attached and rotated by a driving force of said motor
a control type magnetic bearing supporting said rotary shaft in a non-contact manner; and
a protective bearing supporting the rotary shaft when said control type magnetic bearing is unable to support said rotary shaft; wherein
said control type magnetic bearing includes
radial magnetic bearings including radial electromagnets arranged at two portions along axial direction and position detection sensors arranged around respective radial electromagnets, and
an axial magnetic bearing including one axial electromagnet and at least one permanent magnet;
said axial electromagnet is arranged opposing to one end surface of said rotary shaft, and said permanent magnet is arranged opposing to the other end surface of said rotary shaft; and
of said radial magnetic bearings, one radial magnetic bearing is arranged close to said axial electromagnet, and the other radial magnetic bearing is arranged nearer to one side of the rotary shaft than the permanent magnet arranged opposing to an end surface of said rotary shaft.

7. The structure of a reflux fan for an excimer laser apparatus according to claim 6, wherein
said protective bearing includes
a first protective bearing supporting both axial and radial directions of said rotary shaft, and arranged close to said axial electromagnet and said motor, and
a second protective bearing supporting only the radial direction of said rotary shaft, and arranged close to said the other radial electromagnet.

8. The structure of a reflux fan for an excimer laser apparatus according to claim 6, further comprising
a third protective bearing arranged between said motor and said fan.

9. The structure of a reflux fan for an excimer laser apparatus according to claim 6, wherein
a soft magnetic material is provided at a portion of said rotary shaft which opposes to said axial electromagnet,
except for said soft magnetic material, said rotary shaft has its diameter made equal to or smaller than each inner diameter of said first radial magnetic bearing and said second radial magnetic bearing from the side of said axial electromagnet to the side of said permanent magnet.

10. A structure of a reflux fan for an excimer laser apparatus, for circulating laser gas in a chamber by rotation of a fan driven by a motor, comprising:
a rotary shaft on which the fan is attached and rotated by a driving force of said motor,
a control type magnetic bearing supporting said rotary shaft in a non-contact manner; and
a protective bearing supporting the rotary shaft when said control type magnetic bearing is unable to support said rotary shaft; wherein
said control type magnetic bearing includes
radial magnetic bearings including radial electromagnets arranged at two portions along axial direction and position detection sensors arranged around respective radial electromagnets, and
an axial magnetic bearing including one axial electromagnet and at least one permanent magnet;
said axial electromagnet is arranged opposing to one end surface of said rotary shaft, and said permanent magnet is arranged opposing to the other end surface of said rotary shaft;
said motor is arranged close to said axial electromagnet; and
of said radial magnetic bearings, one radial magnetic bearing is arranged between said motor and said fan, and the other radial magnetic bearing is arranged nearer to one side of the rotary shaft than the permanent magnet arranged opposing to an end surface of said rotary shaft.

11. The structure of a reflux fan for an excimer laser apparatus according to claim 1, 6 or 10, wherein said rotary shaft includes an austenitic stainless steel portion, on the surface of which a magnetic body is fixed at a position opposing to at least one of said radial electromagnets.

12. A structure of a reflux fan for an excimer laser apparatus, for circulating laser gas in a chamber by rotation of a fan driven by a motor, comprising:
a rotary shaft on which the fan is attached and rotated by a driving force of said motor, said rotary shaft includes an austenitic stainless steel portion;
a magnetic bearing supporting said rotary shaft in a non-contact manner; and
a magnetic body fixed on a surface of the austenitic stainless steel portion at a position opposing to an electromagnet of said magnetic bearing, wherein a material having at least 16 Ni equivalent given by (% Ni+x% C+0.5 x% Mn) and at least 18 Cr equivalent given by (% Cr+% Mo+1.5 x% Si+0.5 x% Nb) is used for said rotary shaft.

13. A structure of a reflux fan for an excimer laser apparatus, for circulating laser gas in a chamber by rotation of a fan driven by a motor, comprising:

a rotary shaft on which the fan is attached and rotated by a driving force of said motor;

a control type magnetic bearing supporting said rotary shaft in a non-contact manner; and a protective bearing supporting the rotary shaft when said control type magnetic bearing is unable to support said rotary shaft; wherein said control type magnetic bearing includes a radial electromagnet arranged along axial direction of said rotary shaft and a position detection sensor arranged around said radial electromagnet;

said radial electromagnet includes a magnetic pole having a surface facing said rotary shaft, a coil giving said magnetic pole a magnetic field and a first seal member sealing said coil to protect said coil from corrosion by said laser gas and leaving said surface of the magnetic pole exposed to said laser gas; and said position detection sensor includes a sensor unit and a second seal member, the second seal member being separate from said first seal member and sealing to protect said sensor unit from corrosion by said laser gas.

14. The structure of a reflux fan for an excimer laser apparatus according to claim 13, wherein said control type magnetic bearing includes a pair of disk shaped magnetic bodies having a through hole at the center through which said rotary shaft is passed, a plurality of coils arranged parallel in the axial direction between said pair of magnetic bodies, and a cylindrical member formed of a metal having corrosion resistance against said laser gas and sealing circumference of the through hole of said magnetic bodies.

15. The structure of the reflux fan for an excimer laser apparatus according to claim 13, wherein said control type magnetic bearing includes a cylindrical magnetic body having a protrusion therein, and a coil having outer circumference sealed by a metal having corrosion resistance against said laser gas and inserted to the projection of said magnetic body.

16. The structure of a reflux fan for an excimer laser apparatus according to claim 13, wherein said control type magnetic bearing includes a ring shaped non-magnetic body, and a coil arranged at every prescribed angle on said non-magnetic body, sealed by a metal tube having corrosion resistance against said laser gas.

17. The structure of a reflux fan for an excimer laser apparatus according to claim 13, wherein said position sensor includes a disk shaped magnetic body having a through hole to which said rotary shaft is passed at its center, and a plurality of holes formed from outer circumferential surface to the center, sensor units inserted in said plurality of holes, and a cylindrical member formed of a metal having corrosion resistance against said laser gas, sealing the circumference of said through hole.

18. The structure of a reflux fan for an excimer laser apparatus according to claim 13, comprising a first housing provided on one side along a direction of the rotary shaft of said chamber, and a second housing provided on the other side; wherein said radial electromagnets and said position detection sensors include a first radial electromagnet and a first position detection sensor provided in said first housing, and a second radial electromagnet and a second position detection sensor provided in said second housing.

19. The structure of a reflux fan for an excimer laser apparatus according to any one of claims 1 through 5, wherein said first and second radial magnetic bearings are controlled by a first control circuit and a second control circuit, respectively, said first and second control circuits being formed by proportional, differential and integral elements, said third radial magnetic bearing is controlled by a third control circuit formed by proportional and/or differential elements.

20. The structure of a reflux fan for an excimer laser apparatus according to claim 6 or claim 10, wherein said one radial magnetic bearing is controlled by a first control circuit formed by proportional, differential and integral elements and by a second control circuit provided in parallel with said first control circuit and formed by a proportional element, said the other radial magnetic bearing is controlled by a third control circuit formed by proportional, differential and integral elements.

21. The structure of a reflux fan for an excimer laser apparatus according to claim 6 or claim 10, wherein said electromagnet of one radial magnetic bearing has a first coil controlled by a first control circuit formed by proportional, differential and integral elements and a second coil controlled by a second control circuit formed by proportional and/or differential elements, said the other radial magnetic bearing is controlled by a third control circuit formed by proportional, differential and integral elements.

22. The structure of a reflux fan for an excimer laser apparatus according to claim 1, wherein said radial electromagnets have 8 magnetic poles in a circumferential direction, two adjacent magnetic poles of said 8 magnetic poles generate electromagnetic force on the rotary shaft.

23. The structure of a reflux fan for an excimer laser apparatus according to claim 1, wherein said radial electromagnets have four electromagnets in a circumferential direction and corresponding four magnetic poles in the axial direction and a set of two magnetic poles adjacent in the axial direction exerts electromagnetic force on said rotary shaft, each radial magnetic bearing has two control axes, with each control axis supporting self weight of said rotary shaft.

* * * * *